(12) United States Patent  
Gratton

(10) Patent No.: US 10,218,193 B2  
(45) Date of Patent: Feb. 26, 2019

(54) E-CIGARETTE AND RE-CHARGING PACK

(71) Applicant: Nicoventures Holdings Limited, London (GB)

(72) Inventor: Colin Gratton, Essex (GB)

(73) Assignee: Nicoventures Holdings Limited, London (GB)

( * ) Notice: Subject to any disclaimer, the term of this patent is extended or adjusted under 35 U.S.C. 154(b) by 0 days.

(21) Appl. No.: 15/328,786

(22) PCT Filed: Jul. 24, 2015

(86) PCT No.: PCT/GB2015/052151  
§ 371 (c)(1),  
(2) Date: Jan. 24, 2017

(87) PCT Pub. No.: WO2016/016619  
PCT Pub. Date: Feb. 4, 2016

(65) Prior Publication Data  
US 2017/0214261 A1  Jul. 27, 2017

(30) Foreign Application Priority Data  
Jul. 29, 2014 (GB) .................................. 1413433.2

(51) Int. Cl.  
*H02J 7/00* (2006.01)  
*H01M 10/44* (2006.01)  
(Continued)

(52) U.S. Cl.  
CPC ............ *H02J 7/0044* (2013.01); *A24F 15/18* (2013.01); *A24F 47/008* (2013.01); *B65D 25/10* (2013.01);  
(Continued)

(58) Field of Classification Search  
CPC .................................................... H02J 7/0044  
(Continued)

(56) References Cited

U.S. PATENT DOCUMENTS

D53,386 S    5/1919  Thomas  
2,522,952 A  9/1950  Krohn  
(Continued)

FOREIGN PATENT DOCUMENTS

CA    2862045      7/2013  
CN    201094280 Y  8/2008  
(Continued)

OTHER PUBLICATIONS

International Search Report and Written Opinion for International Application No. PCT/GB2015/052151 dated Dec. 3, 2015.  
(Continued)

*Primary Examiner* — Tulsidas C Patel  
*Assistant Examiner* — Peter G Leigh  
(74) *Attorney, Agent, or Firm* — Patterson Thuente Pedersen, P.A.

(57) ABSTRACT

A rechargeable pack is provided for containing and recharging an e-cigarette. The pack includes a pack battery; a first connector which is electrically connectable to an external power source; a first recharging mechanism for re-charging the pack battery using the external power source when the first connector is electrically connected to the external power source; a tube for receiving an e-cigarette such that the e-cigarette can be contained within the recharging pack; a second connector which is electrically connectable to the e-cigarette when the e-cigarette is received within the tube; and a second recharging mechanism for re-charging the e-cigarette using the pack battery when the e-cigarette is electrically connected to the second connector. The second recharging mechanism is configured to provide protection against the pack battery providing excessive current through the second connector.

16 Claims, 9 Drawing Sheets

(51) Int. Cl.
*H01M 10/46* (2006.01)
*A24F 15/18* (2006.01)
*A24F 47/00* (2006.01)
*B65D 25/10* (2006.01)
*B65D 43/16* (2006.01)
*H01M 10/42* (2006.01)

(52) U.S. Cl.
CPC ......... *B65D 43/163* (2013.01); *H01M 10/44* (2013.01); *H01M 10/446* (2013.01); *H01M 10/46* (2013.01); *H02J 7/0021* (2013.01); *H02J 7/0029* (2013.01); *H02J 7/0063* (2013.01); *H01M 10/4221* (2013.01); *H01M 2220/30* (2013.01); *H02J 2007/0039* (2013.01)

(58) Field of Classification Search
USPC ........................................................ 131/328
See application file for complete search history.

(56) References Cited

U.S. PATENT DOCUMENTS

| | | | |
|---|---|---|---|
| 4,214,658 A | 7/1980 | Crow | |
| D279,508 S | 7/1985 | Bauer et al. | |
| 4,947,874 A | 8/1990 | Brooks | |
| 5,044,550 A | 9/1991 | Lamm | |
| D322,687 S | 12/1991 | Tschudin | |
| D346,878 S | 5/1994 | Gee et al. | |
| 5,530,225 A | 6/1996 | Hajaligol | |
| 5,558,429 A | 9/1996 | Cain | |
| 5,649,554 A | 7/1997 | Spinkel | |
| D392,069 S | 3/1998 | Rowland | |
| 5,864,224 A | 1/1999 | Takechi | |
| 5,865,185 A * | 2/1999 | Collins | A24F 47/008 128/200.14 |
| 5,878,752 A | 3/1999 | Adams et al. | |
| 5,952,814 A | 9/1999 | Van Lerberghe | |
| D414,892 S | 10/1999 | Chen | |
| 6,012,459 A | 1/2000 | Keefe | |
| D436,725 S | 1/2001 | Rogers | |
| D441,133 S | 4/2001 | Emery | |
| D449,521 S | 10/2001 | Pinkus et al. | |
| 6,446,793 B1 | 9/2002 | Layshock | |
| 6,483,273 B1 | 11/2002 | Wade et al. | |
| 6,530,495 B1 | 3/2003 | Joseph | |
| 6,637,430 B1 | 10/2003 | Voges | |
| 6,803,550 B2 * | 10/2004 | Sharpe | H05B 6/105 219/263 |
| 6,990,978 B2 | 1/2006 | Shayan | |
| 7,293,565 B2 * | 11/2007 | Griffin | H02J 7/0044 131/329 |
| D566,329 S | 4/2008 | Bagaric et al. | |
| D566,890 S | 4/2008 | Bagaric | |
| 7,455,176 B2 | 11/2008 | Focke | |
| 7,471,062 B2 | 12/2008 | Bruning | |
| 7,876,068 B2 | 1/2011 | Faunce et al. | |
| D631,838 S | 2/2011 | Cheng | |
| D650,738 S | 2/2011 | Leung | |
| 8,156,944 B2 * | 4/2012 | Han | A24F 47/008 131/273 |
| 8,314,591 B2 | 11/2012 | Terry et al. | |
| 8,402,976 B2 | 3/2013 | Fernando et al. | |
| 8,448,783 B2 | 5/2013 | Veechi | |
| D693,055 S | 11/2013 | Manca et al. | |
| D700,397 S | 2/2014 | Manca et al. | |
| 8,794,245 B1 | 8/2014 | Scatterday | |
| D715,760 S | 10/2014 | Kim | |
| D716,267 S | 10/2014 | Kim | |
| D720,884 S | 1/2015 | Liu | |
| D723,738 S | 3/2015 | Liu | |
| 8,978,663 B2 | 3/2015 | Newton | |
| D736,460 S | 8/2015 | McKeon et al. | |
| D737,507 S | 8/2015 | Liu | |
| 9,302,825 B2 | 4/2016 | Liu | |
| 9,499,332 B2 | 11/2016 | Fernando | |
| 9,603,388 B2 | 3/2017 | Fernando | |
| 2004/0150367 A1 | 8/2004 | Cornett | |
| 2004/0261802 A1 | 12/2004 | Griffin | |
| 2006/0070633 A1 * | 4/2006 | Rostami | A24F 47/008 131/194 |
| 2006/0196518 A1 | 9/2006 | Hon | |
| 2008/0121244 A1 | 5/2008 | Bryman | |
| 2008/0185990 A1 | 8/2008 | Hsu | |
| 2008/0257367 A1 | 10/2008 | Paterno et al. | |
| 2008/0258688 A1 | 10/2008 | Hussain | |
| 2009/0278505 A1 | 11/2009 | Toya et al. | |
| 2009/0283103 A1 | 11/2009 | Nielsen | |
| 2010/0033139 A1 | 2/2010 | Wei-Peng | |
| 2010/0307518 A1 * | 12/2010 | Wang | A24F 47/008 131/329 |
| 2011/0097060 A1 | 4/2011 | Buzzetti | |
| 2011/0162663 A1 | 7/2011 | Bryman | |
| 2011/0180433 A1 * | 7/2011 | Rennecamp | A24F 9/16 206/268 |
| 2011/0226236 A1 | 9/2011 | Buchberger | |
| 2011/0265806 A1 * | 11/2011 | Alarcon | A24F 47/00 131/273 |
| 2011/0277761 A1 | 11/2011 | Terry et al. | |
| 2011/0277764 A1 | 11/2011 | Terry et al. | |
| 2012/0127619 A1 | 5/2012 | Mikolajczak | |
| 2012/0169275 A1 | 7/2012 | Lee et al. | |
| 2012/0199146 A1 | 8/2012 | Marangos | |
| 2012/0204889 A1 | 8/2012 | Xiu | |
| 2012/0227753 A1 * | 9/2012 | Newton | A24F 47/008 131/347 |
| 2012/0313576 A1 | 12/2012 | Peiker | |
| 2013/0082646 A1 | 4/2013 | Yeung et al. | |
| 2013/0087160 A1 | 4/2013 | Gherghe | |
| 2013/0098786 A1 | 4/2013 | Collins | |
| 2013/0119773 A1 | 5/2013 | Davis | |
| 2013/0127406 A1 | 5/2013 | Winger et al. | |
| 2013/0145670 A1 | 6/2013 | Kuhlman | |
| 2013/0168880 A1 | 7/2013 | Duke | |
| 2013/0221913 A1 | 8/2013 | Kim | |
| 2013/0257363 A1 | 10/2013 | Lota et al. | |
| 2013/0257382 A1 | 10/2013 | Field | |
| 2013/0265702 A1 | 10/2013 | Merenda | |
| 2013/0284194 A1 | 10/2013 | Newton | |
| 2013/0298905 A1 | 11/2013 | Levin et al. | |
| 2013/0298922 A1 | 11/2013 | Xiang | |
| 2013/0300204 A1 | 11/2013 | Partovi | |
| 2013/0300350 A1 | 11/2013 | Xiang | |
| 2013/0333711 A1 | 12/2013 | Liu | |
| 2013/0336358 A1 | 12/2013 | Liu | |
| 2013/0341218 A1 | 12/2013 | Liu | |
| 2013/0342157 A1 | 12/2013 | Liu | |
| 2014/0007892 A1 | 1/2014 | Liu | |
| 2014/0014124 A1 | 1/2014 | Glasberg et al. | |
| 2014/0020697 A1 | 1/2014 | Liu | |
| 2014/0041655 A1 | 2/2014 | Barron et al. | |
| 2014/0053856 A1 | 2/2014 | Liu | |
| 2014/0053858 A1 * | 2/2014 | Liu | A24F 15/18 131/329 |
| 2014/0083443 A1 * | 3/2014 | Liu | H02J 7/0044 131/329 |
| 2014/0097103 A1 * | 4/2014 | Cameron | A24F 47/008 206/38 |
| 2014/0117784 A1 | 5/2014 | Weissinger | |
| 2014/0123990 A1 * | 5/2014 | Timmermans | A24F 47/008 131/328 |
| 2014/0143566 A1 | 5/2014 | Asano | |
| 2014/0196731 A1 | 7/2014 | Scatterday | |
| 2014/0286002 A1 | 9/2014 | Liu | |
| 2014/0291179 A1 | 10/2014 | Xiang | |
| 2015/0020831 A1 | 1/2015 | Weigensberg | |
| 2015/0114410 A1 | 4/2015 | Doster | |
| 2015/0128975 A1 | 5/2015 | Alarcon | |
| 2015/0181942 A1 | 7/2015 | Holzherr | |
| 2015/0201676 A1 | 7/2015 | Shin | |
| 2015/0333542 A1 | 11/2015 | Alarcon | |
| 2015/0333552 A1 | 11/2015 | Alarcon | |
| 2015/0333561 A1 | 11/2015 | Alarcon | |
| 2016/0226286 A1 | 8/2016 | Xiang | |

(56) References Cited

U.S. PATENT DOCUMENTS

| | | |
|---|---|---|
| 2016/0250201 A1 | 9/2016 | Rose |
| 2016/0316822 A1 | 11/2016 | Qiuming |
| 2016/0360793 A1 | 12/2016 | Qiuming |
| 2017/0114965 A1 | 4/2017 | Maglica |
| 2017/0207499 A1 | 7/2017 | Leadley |
| 2017/0208865 A1 | 7/2017 | Nettenstrom |
| 2017/0222468 A1 | 8/2017 | Schennum |

FOREIGN PATENT DOCUMENTS

| | | |
|---|---|---|
| CN | 201290340 Y | 8/2009 |
| CN | 201299102 Y | 9/2009 |
| CN | 201341434 Y | 11/2009 |
| CN | 201370099 Y | 12/2009 |
| CN | 201370099 Y | 12/2009 |
| CN | 201374580 Y | 12/2009 |
| CN | 201384062 Y | 1/2010 |
| CN | 201408820 Y | 2/2010 |
| CN | 201430913 Y | 3/2010 |
| CN | 201451372 U | 5/2010 |
| CN | 201451373 U | 5/2010 |
| CN | 201451374 U | 5/2010 |
| CN | 201499600 U | 6/2010 |
| CN | 201528661 U | 7/2010 |
| CN | 201550602 U | 8/2010 |
| CN | 201571500 U | 9/2010 |
| CN | 201591127 U | 9/2010 |
| CN | 101869356 A | 10/2010 |
| CN | 201630238 U | 11/2010 |
| CN | 201699440 U | 1/2011 |
| CN | 201813848 U | 5/2011 |
| CN | 203662028 U | 6/2011 |
| CN | 101371721 B | 7/2011 |
| CN | 201911290 U | 8/2011 |
| CN | 201928066 U | 8/2011 |
| CN | 201947014 U | 8/2011 |
| CN | 201985553 U | 9/2011 |
| CN | 202122096 U | 1/2012 |
| CN | 202419162 | 9/2012 |
| CN | 202474905 U | 10/2012 |
| CN | 102832667 | 12/2012 |
| CN | 102832669 | 12/2012 |
| CN | 202679020 U | 1/2013 |
| CN | 102916461 A | 2/2013 |
| CN | 202819631 U | 3/2013 |
| CN | 202840580 | 3/2013 |
| CN | 203087527 | 7/2013 |
| CN | 203166461 | 8/2013 |
| CN | 203166462 U | 8/2013 |
| CN | 203166467 | 8/2013 |
| CN | 203166467 U | 8/2013 |
| CN | 203166473 U | 8/2013 |
| CN | 203182014 | 9/2013 |
| CN | 203182016 | 9/2013 |
| CN | 203251961 | 10/2013 |
| CN | 203251962 | 10/2013 |
| CN | 203326663 | 12/2013 |
| CN | 203326671 | 12/2013 |
| CN | 203337806 | 12/2013 |
| CN | 203368107 | 12/2013 |
| CN | 103504479 | 1/2014 |
| CN | 203386835 | 1/2014 |
| CN | 203387219 U | 1/2014 |
| CN | 203388261 | 1/2014 |
| CN | 203398771 | 1/2014 |
| CN | 203424298 | 2/2014 |
| CN | 203424299 | 2/2014 |
| CN | 203424301 | 2/2014 |
| CN | 203424303 | 2/2014 |
| CN | 203434223 | 2/2014 |
| CN | 203481334 | 3/2014 |
| CN | 203482903 | 3/2014 |
| CN | 203504217 U | 3/2014 |
| CN | 203537022 U | 4/2014 |
| CN | 203607468 | 5/2014 |
| CN | 203633514 | 6/2014 |
| DE | 102007011120 A1 | 9/2008 |
| DE | 102008003782 A1 | 7/2009 |
| EP | 2079142 A1 | 10/2008 |
| EP | 2022349 | 2/2009 |
| EP | 2079142 A1 | 7/2009 |
| EP | 2249454 | 11/2010 |
| EP | 2251954 | 11/2010 |
| EP | 2253233 A1 | 11/2010 |
| EP | 2267864 | 12/2010 |
| EP | 2157873 B1 | 7/2011 |
| EP | 2454956 A1 | 5/2012 |
| EP | 2573900 A1 | 3/2013 |
| EP | 2573900 A1 | 3/2013 |
| EP | 2651006 A1 | 10/2013 |
| EP | 2653047 | 10/2013 |
| EP | 2668858 A1 | 12/2013 |
| ES | 1061110 U | 1/2006 |
| GB | 1046183 | 7/1988 |
| GB | 2068034 | 11/1997 |
| GB | 2418306 | 3/2006 |
| GB | 4000273 | 12/2006 |
| GB | 4006615 | 10/2008 |
| GB | 2524736 A | 3/2013 |
| JP | H0646531 | 2/1994 |
| JP | 3164408 U | 11/2010 |
| JP | 2012029517 | 2/2012 |
| JP | 2012090427 A | 5/2012 |
| JP | 2013118719 | 6/2013 |
| KR | 200448273 Y1 | 3/2010 |
| KR | 20110009632 U | 4/2010 |
| KR | 200451581 Y1 | 12/2010 |
| KR | 200451995 Y1 | 1/2011 |
| KR | 200460461 Y1 | 5/2012 |
| KR | 20120003872 U | 6/2012 |
| KR | 20120057459 | 6/2012 |
| KR | 20120081003 A | 7/2012 |
| KR | 20120117261 | 10/2012 |
| KR | 20120008831 U | 12/2012 |
| KR | 101267537 | 5/2013 |
| NL | 9301184 A | 2/1995 |
| RU | 2242065 C2 | 12/2004 |
| WO | WO 2005/038952 | 4/2005 |
| WO | WO2006082571 A1 | 8/2006 |
| WO | WO2007072366 | 6/2007 |
| WO | WO2008130813 | 10/2008 |
| WO | WO2010133342 | 11/2010 |
| WO | WO 2011/031930 A2 | 3/2011 |
| WO | WO2011137453 | 11/2011 |
| WO | WO2011146320 | 11/2011 |
| WO | WO2011146329 | 11/2011 |
| WO | WO2011146330 | 11/2011 |
| WO | WO2012100430 | 8/2012 |
| WO | WO2013092305 | 6/2013 |
| WO | WO2013138384 | 9/2013 |
| WO | WO2013174002 | 11/2013 |
| WO | WO2013185358 | 12/2013 |
| WO | WO2013189050 | 12/2013 |
| WO | WO2013189052 | 12/2013 |
| WO | WO2014005275 | 1/2014 |
| WO | WO2014008646 | 1/2014 |
| WO | WO2014017794 | 1/2014 |
| WO | WO2014029105 | 2/2014 |
| WO | WO2014043887 | 3/2014 |
| WO | WO 2014047953 A1 | 4/2014 |
| WO | WO 2014163664 A1 | 10/2014 |
| WO | WO 2016/016619 | 2/2016 |
| WO | WO 2016/016620 | 2/2016 |

OTHER PUBLICATIONS

IPRP for International Application No. PCT/GB2015/052151 dated Oct. 10, 2016.
Russian Office Action, Application No. 2017102709, dated May 11, 2018, 11 pages.
Richtek, *Understanding the Characteristics of Li-ion Batteries and Richtek Power Management Solutions*, dated Jan. 2014, 22 pages.

(56) References Cited

OTHER PUBLICATIONS

Great Britain Examination Report, Application No. GB1413433.2, dated Jun. 20, 2018, 6 pages.
Great Britain Examination Report, Application No. GB1804157.4, dated May 25, 2018, 9 pages.
Great Britain Office Action, Application No. GB1413433.2, dated Dec. 6, 2017, 6 pages.
Great Britain Examination Report, Application No. GB1413433.2, dated Aug. 10, 2017, 6 pages.
Westcott, Richard, BBC Transport Correspondent, *Batteries on planes pose 'increased fire risk'*, dated Feb. 4, 2014, 3 pages.
International Search Report and Written Opinion, International Application No. PCT/GB2015/052152, dated Oct. 8, 2015, 13 pages.
GB Search Report, Application No. GB1413432.4, dated Mar. 31, 2015, 3 pages.
GB Search Report, Application No. GB1413432.4, dated Mar. 31, 2015, 9 pages.
International Preliminary Report on Patentability, International Application No. PCT/GB2015/052152, dated Feb. 21, 2016, 17 pages.
International Preliminary Report on Patentability, Application No. PCT/GB2015/052129, dated Jan. 24, 2017, 7 pages.
Translation of Russian Search Report, Application No. 2017101966, dated Jan. 30, 2018, 2 pages.
Office Action dated Sep. 3, 2014, for Russian Application No. 2013504605, 7 pages.
Notification of International Preliminary Report on Patentability, Application No. PCT/GB2015/050957, dated Oct. 13, 2016, 9 pages.
Search Report for corresponding GB Application No. 1405719.4 dated Aug. 29, 2014; 4 pages.
International Search Report for corresponding International Application No. PCT/GB2015/050957 dated Jul. 24, 2015; 6 pages.
Written Opinion for corresponding International Application No. PCT/GB2015/050957 dated Jul. 24, 2015; 7 pages.
International Search Report for corresponding International Application No. PCT/GB2015/050956 dated Jul. 24, 2015, 5 pages.
Written Opinion for corresponding International Application No. PCT/GB2015/050956 dated Jul. 24, 2015, 8 pages.
International Preliminary Report on Patentability for corresponding International Application No. PCT/GB2015/050956 dated Jul. 8, 2016, 16 pages.
Search Report for corresponding GB Application No. 1405721.0 dated Sep. 23, 2014, 5 pages.
International Search Report and Written Opinion, International Application No. PCT/GB2015/052129, dated Sep. 7, 2015, 10 pages.
EP Search Report, Application No. GB1413127.7, dated Jan. 22, 2015, 5 pages.
Chinese Office Action, Application No. 201580037444.5, dated Dec. 3, 2018, 7 pages.

\* cited by examiner

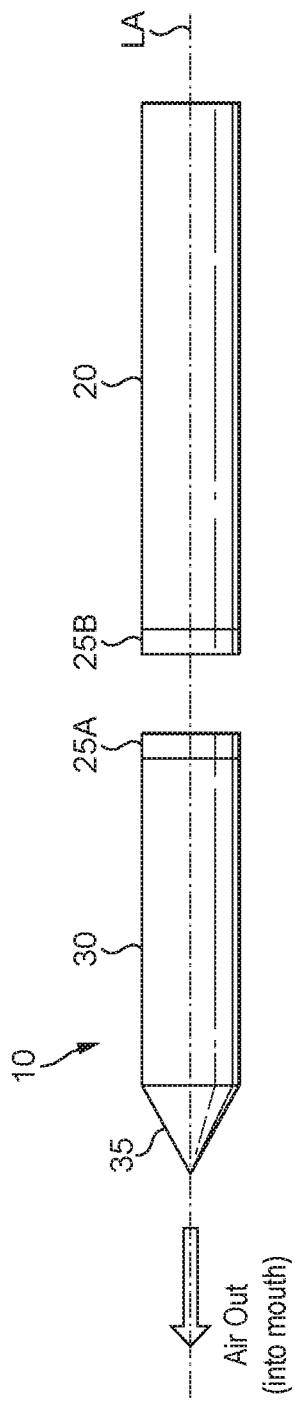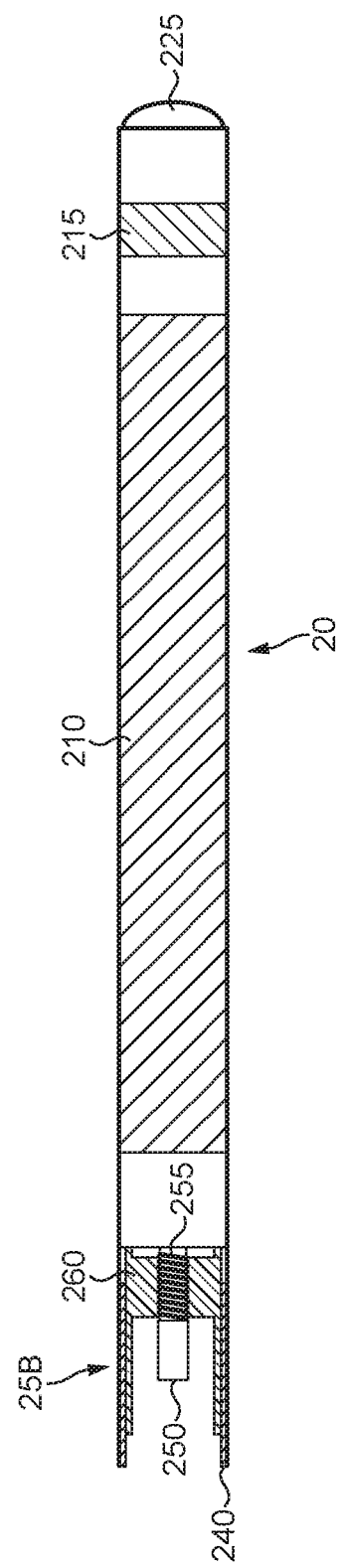

E-CIGARETTE AND RE-CHARGING PACK

CROSS-REFERENCE TO RELATED APPLICATIONS

The present application is a National Phase entry of PCT Application No. PCT/GB2015/052151, filed on 24 Jul. 2015, which claims priority to GB Patent Application No. 1413433.2, filed on 29 Jul. 2014, which are hereby fully incorporated herein by reference.

TECHNICAL FIELD

The present application relates to an e-cigarette, such as an electronic vapor provision system or an electronic nicotine delivery system, and a re-charging pack for the e-cigarette.

BACKGROUND

Electronic vapor provision systems, electronic nicotine delivery systems, etc., which are collectively referred to herein as e-cigarettes, generally contain a reservoir of liquid which is to be vaporized. When a user sucks or draws on the device, this activates a heater to vaporize a small amount of liquid, which is then inhaled by the user. Most e-cigarettes include a re-chargeable battery for supplying electrical power to the heater and other electrical/electronic components, such as a sensor to detect inhalation. Some e-cigarettes have a cartridge section. After the nicotine or other liquid in this cartridge has been exhausted, the empty cartridge can be removed or separated from the e-cigarette and replaced with a new cartridge containing further nicotine.

E-cigarettes are often supplied in packs for protection and easy portability. Such packs may accommodate multiple e-cigarettes and/or replacement cartridges, thereby offering a backup facility if one e-cigarette (or its cartridge) is exhausted. An e-cigarette pack may also have the ability to re-charge an e-cigarette, again helping to ensure good operating availability of the e-cigarette for a user. Such a pack may be provided with a cylindrical hole for receiving an e-cigarette for recharging, the hole generally reflecting the elongated, cylindrical shape of an e-cigarette. When the e-cigarette is located in the hole, the battery can be re-charged by a suitable wired or wireless connection (a wireless connection may rely upon induction charging). In some packs, the cylindrical hole may receive the entire e-cigarette for re-charging, while in other packs only a portion of the e-cigarette may be received into the hole.

In some devices, the pack must be connected to a power supply, e.g. a mains outlet or USB connection, during re-charging of the e-cigarette battery. In this case, the pack is typically acting as a convenient device for holding and interfacing to the e-cigarette during re-charging. In other devices, the pack itself is provided with a battery (or other charge storage facility). The pack battery allows the e-cigarette to be re-charged from the pack without the need for the pack to be connected to an external power supply during the re-charging, thereby providing greater convenience for a user.

The pack battery will be depleted in due course, and so is generally provided with its own re-charging facility—typically again reliant upon some form of mains or USB connection. However, since the pack is larger than an e-cigarette, it can accommodate a larger battery and therefore the pack does not have to be re-charged as frequently as an e-cigarette. For example, the charge capacity of a typical e-cigarette battery may be approximately 60 mAh, whereas the charge capacity of a typical pack battery might be in the region of 800 mAh. Accordingly, the pack battery is capable of re-charging the e-cigarette a few times at least before the pack battery itself needs to be re-charged.

Such a multiple or hierarchical arrangement of separately chargeable systems, namely firstly an e-cigarette and secondly a pack for the e-cigarette, is relatively rare. In contrast, most re-chargeable devices, e.g. mobile (cell) phones, are usually connected directly to a mains-powered charging supply (or else to an in-car charging supply). Furthermore, when the pack is connected to an external power supply, the pack may charge both the pack battery and an e-cigarette battery simultaneously, i.e. some electrical power from the external source is directed to the pack battery, while at the same time, some electrical power from the external source is directed to the e-cigarette for re-charging the battery within the e-cigarette.

It is desirable for the operation and (re)charging of an e-cigarette and associated pack to be as safe, reliable and convenient for a user as possible.

SUMMARY

A rechargeable pack is provided for containing and recharging an e-cigarette. The pack comprises a pack battery; a first connector which is electrically connectable to an external power source; a first recharging mechanism for re-charging the pack battery using the external power source when the first connector is electrically connected to the external power source; a tube for receiving an e-cigarette such that the e-cigarette can be contained within the recharging pack; a second connector which is electrically connectable to the e-cigarette when the e-cigarette is received within the tube; and a second recharging mechanism for re-charging the e-cigarette using the pack battery when the e-cigarette is electrically connected to the second connector. The second recharging mechanism is configured to provide protection against the pack battery providing excessive current through the second connector.

A rechargeable e-cigarette is provided comprising: a battery which provides a voltage output that has a maximum level when the battery is fully charged; a connector located on the exterior of the e-cigarette to allow the e-cigarette to be electrically connected to an external battery pack for re-charging without disassembly of the e-cigarette; and a recharging mechanism for re-charging the battery using power from the external battery pack when the connector is electrically connected to the external battery pack. The re-charging mechanism is configured to determine the voltage output of the battery, and to prevent re-charging of the battery if the voltage output of the battery is above a predefined threshold level, wherein said predefined threshold level is below the maximum voltage output level of the battery.

The present approach is not restricted to specific embodiments such as set out herein, but features from different embodiments may be combined, modified, omitted or replaced by the skilled person according to the circumstances of any given implementation.

BRIEF DESCRIPTION OF THE DRAWINGS

Various embodiments of the disclosure will now be described in detail by way of example only with reference to the following drawings:

FIG. 1 is a schematic (exploded) diagram of an e-cigarette in accordance with some embodiments of the disclosure.

FIG. 2 is a schematic (simplified) diagram of a body of the e-cigarette of FIG. 1 in accordance with some embodiments of the disclosure.

DETAILED DESCRIPTION

Figure 3:
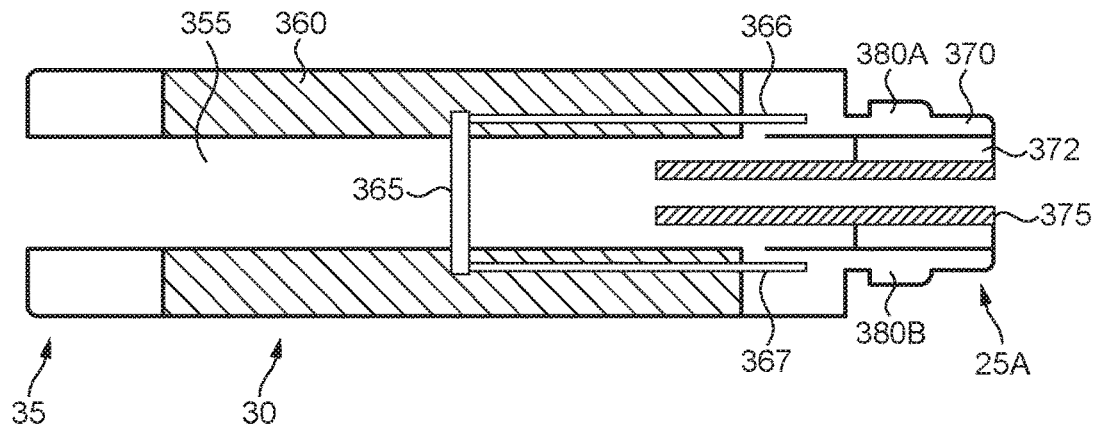
FIG. 3 is a schematic diagram of a cartomizer of the e-cigarette of FIG. 1 in accordance with some embodiments of the disclosure.

FIG. 1 is a schematic diagram of an electronic vapor provision system such as an e-cigarette 10 in accordance with some embodiments of the disclosure (not to scale). The e-cigarette has a generally cylindrical shape, extending along a longitudinal axis indicated by dashed line LA, and comprises two main components, namely a body 20 and a cartomizer 30. The cartomizer 30 includes an internal chamber containing a reservoir of nicotine, a vaporizer (such as a heater), and a mouthpiece 35. The reservoir may be a foam matrix or any other structure for retaining the nicotine until such time that it is required to be delivered to the vaporizer. The cartomizer 30 also includes a heater for vaporizing the nicotine and may further include a wick or similar facility to transport a small amount of nicotine from the reservoir to a heating location on or adjacent the heater.

The body 20 includes a re-chargeable cell or battery to provide power to the e-cigarette 10 and a circuit board for generally controlling the e-cigarette 10. When the heater receives power from the battery, as controlled by the circuit board, the heater vaporizes the nicotine and this vapor is then inhaled by a user through the mouthpiece.

The body 20 and cartomizer 30 are detachable from one another by separating in a direction parallel to the longitudinal axis LA, as shown in FIG. 1, but are joined together when the device 10 is in use by a connection, indicated schematically in FIG. 1 as 25A and 25B, to provide mechanical and electrical connectivity between the body 20 and the cartomizer 30. The electrical connector on the body 20 that is used to connect to the cartomizer 30 also serves as a socket for connecting a charging device (not shown) when the body 20 is detached from the cartomizer 30. The other end of the charging device can be plugged into a USB socket to re-charge the cell in the body 20 of the e-cigarette 10. In other implementations, a cable may be provided for direct connection between the electrical connector on the body 20 and a USB socket.

The e-cigarette 10 is provided with one or more holes (not shown in FIG. 1) for air inlet. These holes connect to an air passage through the e-cigarette 10 to the mouthpiece 35. When a user inhales through the mouthpiece 35, air is drawn into this air passage through the one or more air inlet holes, which are suitably located on the outside of the e-cigarette 10. This airflow (or the resulting change in pressure) is detected by a pressure sensor that in turn activates the heater to vaporize the nicotine from the cartridge. The airflow passes through, and combines with, the nicotine vapor, and this combination of airflow and nicotine vapor then passes out of the mouthpiece 35 to be inhaled by a user. The cartomizer 30 may be detached from the body 20 and disposed of when the supply of nicotine is exhausted (and replaced with another cartomizer if so desired).

It will be appreciated that the e-cigarette 10 shown in FIG. 1 is presented by way of example, and various other implementations can be adopted. For example, in some embodiments, the cartomizer 30 is provided as two separable components, namely a cartridge comprising the nicotine reservoir and mouthpiece (which can be replaced when the nicotine from the reservoir is exhausted), and a vaporizer comprising a heater (which is generally retained). In other embodiments, the e-cigarette 10, the body 20 and the cartomizer 30 may be joined together permanently, so in effect they are just a single component. Some such unitary (one-piece) e-cigarettes may allow replenishing of a nicotine reservoir when exhausted using some suitable (re)supply mechanism; other one-piece e-cigarettes may be disposed of once the nicotine reservoir has been exhausted. Note that this latter type of device still generally supports re-charging because the battery will normally become depleted more quickly than the nicotine reservoir. The skilled person will be aware of many further possible designs and implementations of an e-cigarette.

FIG. 2 is a schematic (simplified) diagram of the body 20 of the e-cigarette 10 of FIG. 1 in accordance with some embodiments of the disclosure. FIG. 2 can generally be regarded as a cross-section in a plane through the longitudinal axis LA of the e-cigarette 10. Note that various components and details of the body 20, e.g. such as wiring and more complex shaping, have been omitted from FIG. 2 for reasons of clarity.

As shown in FIG. 2, the body 20 includes a battery or cell 210 for powering the e-cigarette 10, as well as a chip, such as an application specific integrated circuit (ASIC) or microcontroller for controlling the e-cigarette 10. The ASIC may be positioned alongside or at one end of the battery 210. The ASIC is attached to a sensor unit 215 to detect an inhalation on mouthpiece 35 (or alternatively the sensor unit 215 may be provided on the ASIC itself). In response to such a detection, the ASIC provides power from the battery or cell 210 to a heater in the cartomizer to vaporize nicotine into the airflow which is inhaled by a user.

The body 20 further includes a cap 225 to seal and protect the far (distal) end of the e-cigarette 10. There is an air inlet hole provided in or adjacent to the cap 225 to allow air to enter the body 20 and flow past the sensor unit 215 when a user inhales on the mouthpiece 35. This airflow therefore allows the sensor unit 215 to detect the user inhalation. The cap 225 may also comprise a pair of electrical contacts which allow the e-cigarette 10 to be charged using these electrical contacts (in addition to, or instead of, USB charging or the like using the connector 25B). This is explained in more detail below.

At the opposite end of the body 20 from the cap 225 is the connector 25B for joining the body 20 to the cartomizer 30. The connector 25B provides mechanical and electrical connectivity between the body 20 and the cartomizer 30. The connector 25B includes a body connector 240, which is metallic (silver-plated in some embodiments) to serve as one terminal for electrical connection (positive or negative) to the cartomizer 30. The connector 25B further includes an electrical contact 250 to provide a second terminal for electrical connection to the cartomizer 30 of opposite polarity to the first terminal, namely body connector 240. The electrical contact 250 is mounted on a coil spring 255. When the body 20 is attached to the cartomizer 30, the connector 25A on the cartomizer 30 pushes against the electrical contact 250 in such a manner as to compress the coil spring in an axial direction, i.e. in a direction parallel to (co-aligned with) the longitudinal axis LA. In view of the resilient nature of the spring 255, this compression biases the spring 255 to expand, which has the effect of pushing the electrical contact 250 firmly against connector 25A, thereby helping to ensure good electrical connectivity between the body 20 and the cartomizer 30. The body connector 240 and the electrical contact 250 are separated by a trestle 260, which is made of a non-conductor (such as plastic) to provide good insulation between the two electrical terminals. The trestle 260 is shaped to assist with the mutual mechanical engagement of connectors 25A and 25B.

FIG. 3 is a schematic diagram of the cartomizer 30 of the e-cigarette 10 of FIG. 1 in accordance with some embodiments of the disclosure. FIG. 3 can generally be regarded as a cross-section in a plane through the longitudinal axis LA of the e-cigarette 10. Note that various components and details of the body 20, e.g. such as wiring and more complex shaping, have been omitted from FIG. 3 for reasons of clarity.

The cartomizer 30 includes an air passage 355 extending along the central (longitudinal) axis of the cartomizer 30 from the mouthpiece 35 to the connector 25A for joining the cartomizer 30 to the body 20. A reservoir of nicotine 360 is provided around the air passage 335. This reservoir 360 may be implemented, for example, by providing cotton or foam soaked in nicotine. The cartomizer 30 also includes a heater 365 for heating nicotine from reservoir 360 to generate nicotine vapor to flow through air passage 355 and out through mouthpiece 35 in response to a user inhaling on the e-cigarette 10. The heater 365 is powered through lines 366 and 367, which are in turn connected to opposing polarities (positive and negative, or vice versa) of the battery 210 via connector 25A (the details of the wiring between the power lines 366 and 367 and connector 25A are omitted from FIG. 3).

The connector 25A includes an inner electrode 375, which may be silver-plated or made of some other suitable metal. When the cartomizer 30 is connected to the body 20, the inner electrode 375 contacts the electrical contact 250 of the body 20 to provide a first electrical path between the cartomizer and the body. In particular, as the connectors 25A and 25B are engaged, the inner electrode 375 pushes against the electrical contact 250 so as to compress the coil spring 255, thereby helping to ensure good electrical contact between the inner electrode 375 and the electrical contact 250.

The inner electrode 375 is surrounded by an insulating ring 372, which may be made of plastic, rubber, silicone, or any other suitable material. The insulating ring 372 is surrounded by the cartomizer connector 370, which may be silver-plated or made of some other suitable metal or conducting material. When the cartomizer 30 is connected to the body 20, the cartomizer connector 370 contacts the body connector 240 of the body 20 to provide a second electrical path between the cartomizer and the body. In other words, the inner electrode 375 and the cartomizer connector 370 serve as positive and negative terminals (or vice versa) for supplying power from the battery 210 in the body to the heater 365 in the cartomizer 30 via supply lines 366 and 367 as appropriate.

The cartomizer connector 370 is provided with two lugs or tabs 380A, 380B, which extend in opposite directions away from the longitudinal axis of the e-cigarette 10. These tabs are used to provide a bayonet fitting in conjunction with the body connector 240 for connecting the cartomizer 30 to the body 20. This bayonet fitting provides a secure and robust connection between the cartomizer 30 and the body 20, so that the cartomizer 30 and body 20 are held in a fixed position relative to one another, without wobble or flexing, and the likelihood of any accidental disconnection is very small. At the same time, the bayonet fitting provides simple and rapid connection and disconnection by an insertion followed by a rotation for connection, and a rotation (in the reverse direction) followed by withdrawal for disconnection. It will be appreciated that other embodiments may use a different form of connection between the body 20 and the cartomizer 30, such as a snap fit or a screw connection.

Figure 4:
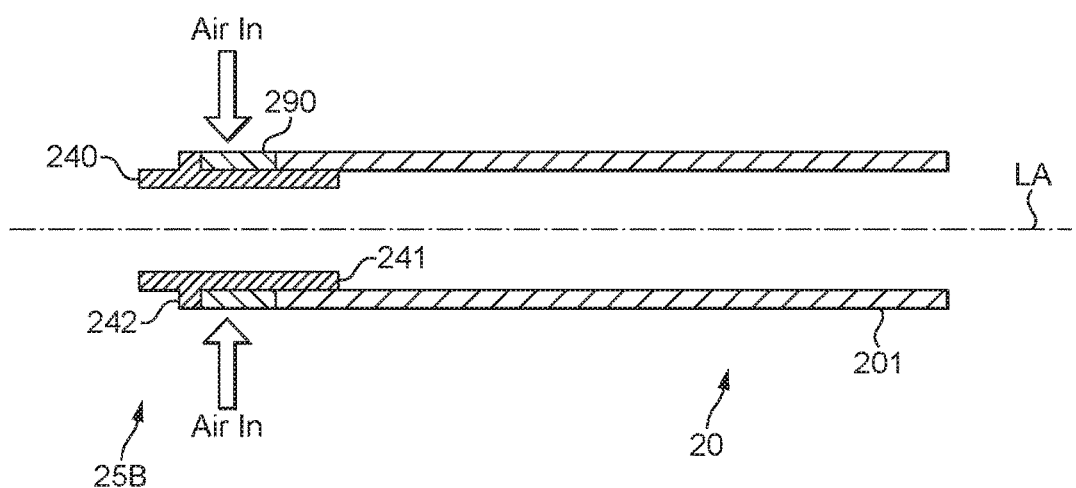
FIG. 4 is a schematic diagram of certain details of a connector at one end of the body of the e-cigarette of FIG. 1 in accordance with some embodiments of the disclosure.

FIG. 4 is a schematic diagram of certain details of the connector 25B at the end of the body 20 in accordance with some embodiments of the disclosure (but omitting for clarity most of the internal structure of the connector as shown in FIG. 2, such as trestle 260). In particular, FIG. 4 shows the external housing 201 of the body 20, which generally has the form of a cylindrical tube. This external housing 201 may comprise, for example, an inner tube of metal with an outer covering of paper or similar.

The body connector 240 extends from this external housing 201 of the body 20. The body connector as shown in FIG. 4 comprises two main portions, a shaft portion 241 in the shape of a hollow cylindrical tube, which is sized to fit just inside the external housing 201 of the body 20, and a lip portion 242 which is directed in a radially outward direction, away from the main longitudinal axis (LA) of the e-cigarette 10. Surrounding the shaft portion 241 of the body connector 240, where the shaft portion 241 does not overlap with the external housing 201, is a collar or sleeve 290, which is again in a shape of a cylindrical tube. The collar 290 is retained between the lip portion 242 of the body connector 240 and the external housing 201 of the body 20, which together prevent movement of the collar 290 in an axial direction (i.e. parallel to axis LA). However, collar 290 may be free to rotate around the shaft portion 241 (and hence also axis LA).

As mentioned above, the cap 225 is provided with an air inlet hole to allow air to flow past sensor 215 when a user inhales on the mouthpiece 35. However, the majority of air that enters the device 10 when a user inhales flows through collar 290 and body connector 240 as indicated by the two arrows in FIG. 4. (The collar 290 and the body connector 240 are provided with holes, not shown in FIG. 4, to support such airflow.)

Figure 5:
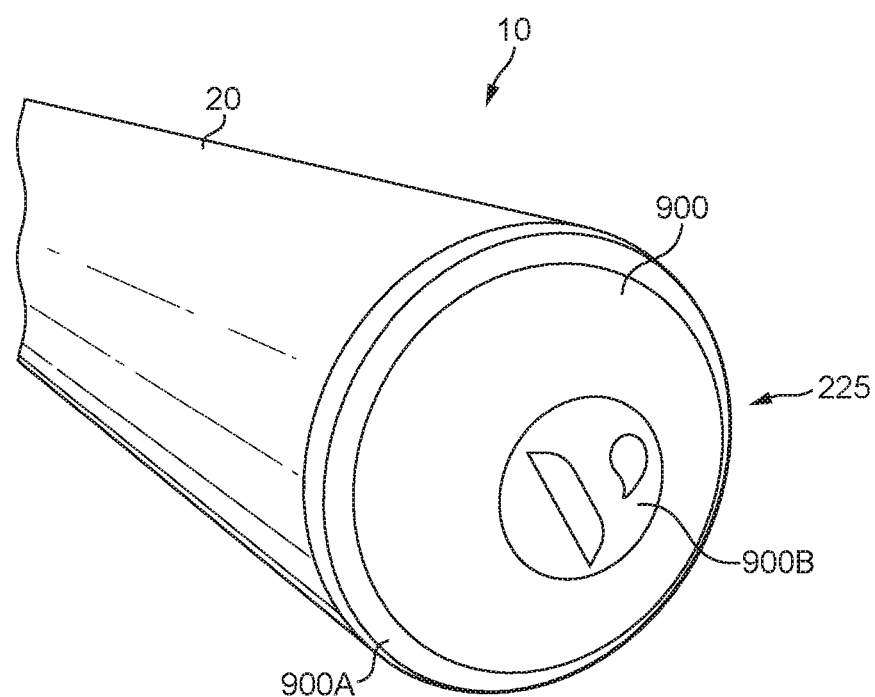
FIG. 5 illustrates a cap with a connector at another end of the body of the e-cigarette of FIG. 1 in accordance with some embodiments of the disclosure.

FIG. 5 shows the cap or tip 225 of the body 20 of the e-cigarette 10 in accordance with some embodiments of the disclosure. The cap 225 comprises a connector 900 comprising two electrical contacts 900A, 900B. The electrical contact 900B is a circular point-type contact located at the centre of the cap 225. The electrical contact 900A is a circular ring which is concentric with the contact 900A and provided around the outside or rim of the cap 225. It will, however, be appreciated that any other shape configuration of the electrical contacts could be used. The electrical contacts 900A, 900B are typically made of metal and are connectable to positive and negative electrical terminals of a recharging e-cigarette pack so as to (re)charge the e-cigarette (as explained in more detail later on). The tip of the e-cigarette, in particular connector 900, may be covered by a user-removable protective tab or similar while shipping or before use to protect against the battery 210 accidentally discharging prior to first use by a consumer. This helps to ensure that the battery 210 is delivered in an acceptable state to the consumer, and also that damage which might be caused by heating due to unexpected current flows from the battery 210 is avoided.

Figure 6:
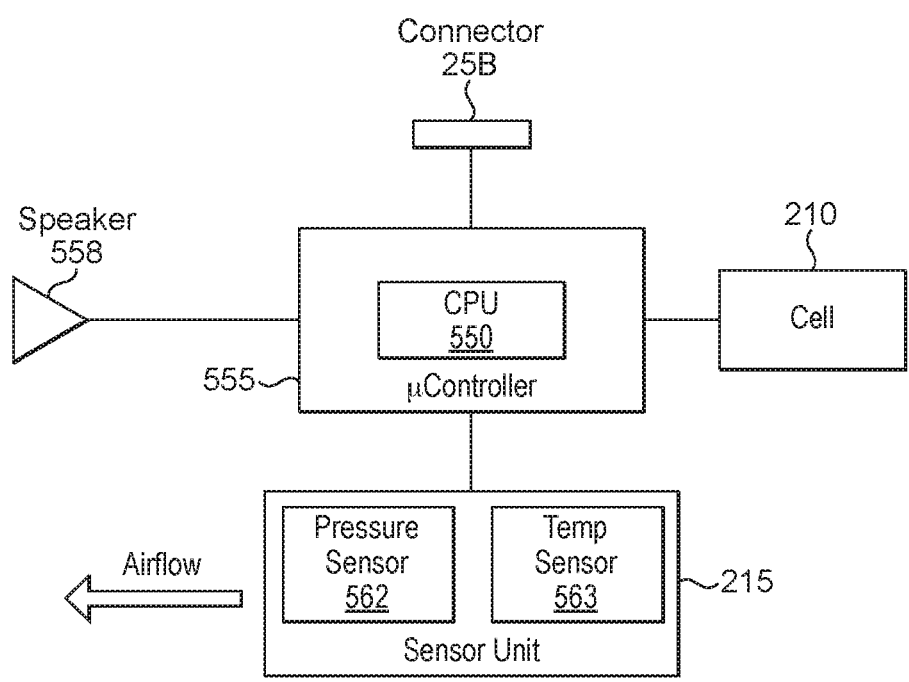
FIG. 6 is a schematic diagram of the main functional components of the body of the e-cigarette of FIG. 1 in accordance with some embodiments of the disclosure.

FIG. 6 is a schematic diagram of the main functional components of the body 20 of the e-cigarette 10 of FIG. 1 in accordance with some embodiments of the disclosure. These components may be mounted on the circuit board provided within the body 20, although depending on the particular configuration, in some embodiments, one or more of the components may instead be accommodated in the body 20 to operate in conjunction with the circuit board, but is/are not physically mounted on the circuit board itself.

The body 20 includes the sensor unit 215 located in or adjacent to the air path through the body 20 from the air inlet to the air outlet (to the vaporizer). The sensor unit 215 includes a pressure drop sensor 562 and temperature sensor 563 (also in or adjacent to this air path). The body 20 further includes a small speaker 558 and an electrical socket or connector 25B for connecting to the cartomizer 30 or to a USB charging device. (The body may also be provided with a tip connector 900, such as discussed above in relation to FIG. 5.) The microcontroller (e.g. an ASIC) 555 includes a CPU 550. The operations of the CPU 550 and other electronic components, such as the pressure sensor 562, are generally controlled at least in part by software programs running on the CPU 550 (or other component). Such software programs may be stored in non-volatile memory, such as ROM, which can be integrated into the microcontroller 555 itself, or provided as a separate component. The CPU 550 may access the ROM to load and execute individual software programs as and when required. The microcontroller 555 also contains appropriate communications interfaces (and control software) for communicating as appropriate with other devices in the body 10, such as the pressure sensor 562.

The CPU 550 controls the speaker 558 to produce audio output to reflect conditions or states within the e-cigarette 10, such as a low battery warning. Different signals for signaling different states or conditions may be provided by utilizing tones or beeps of different pitch and/or duration, and/or by providing multiple such beeps or tones. The e-cigarette 10 may also be provided with an LED indicator (instead of or as well as speaker 558) to provide visual output to a user, such as a warning of low battery charge.

As noted above, the e-cigarette 10 provides an air path from the air inlet through the e-cigarette, past the pressure drop sensor 562 and the heater (in the vaporizer or cartomizer 30), to the mouthpiece 35. Thus when a user inhales on the mouthpiece of the e-cigarette 10, the CPU 550 detects such inhalation based on information from the pressure drop sensor 562. In response to this detection, the CPU 550 supplies power from the battery or cell 210 to the heater 365, which thereby heats and vaporizes the nicotine from the wick for inhalation by the user. The level of power supplied to the heater 365 may be controlled on the basis of information from the pressure sensor and/or the temperature sensor 563, for example, to help regulate the nicotine delivery to the user according to the current ambient air pressure and temperature.

Figure 7:
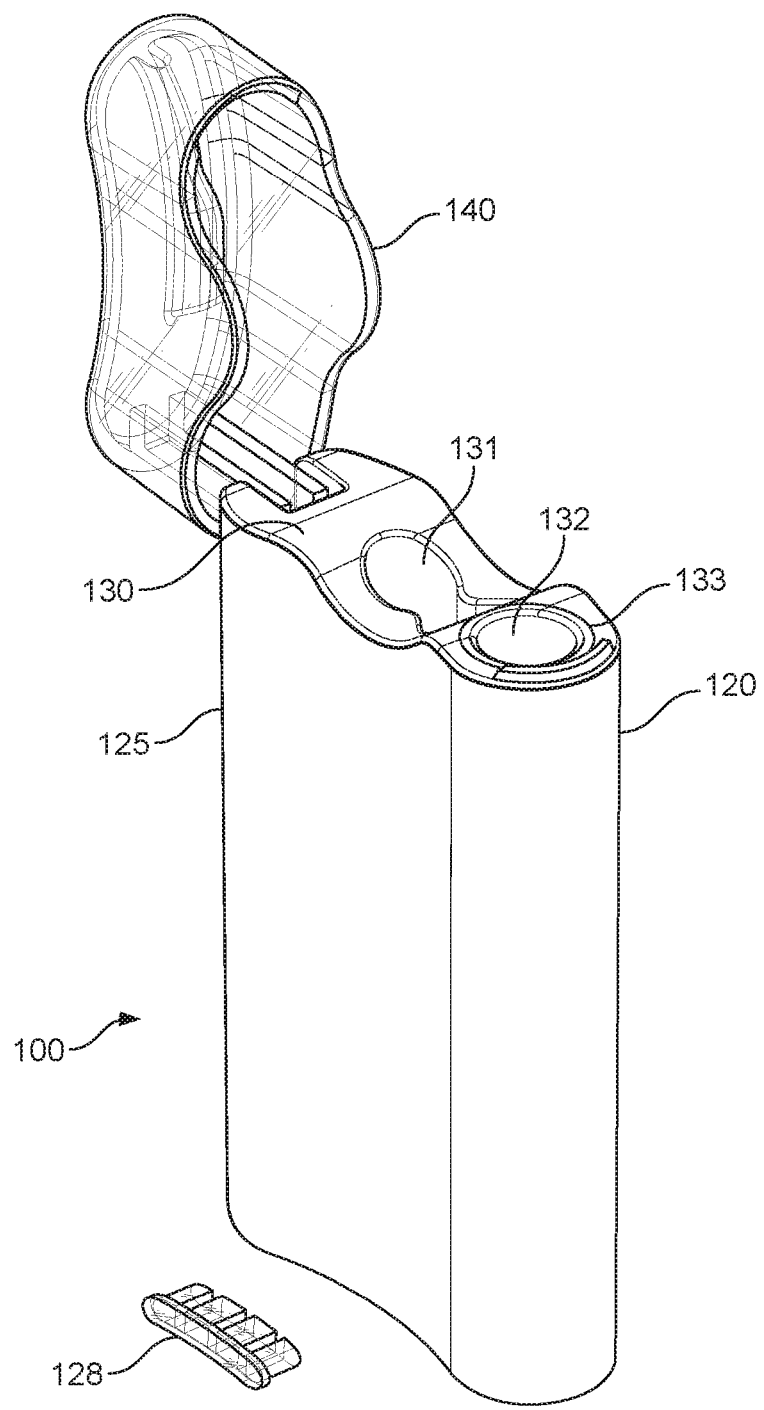
FIG. 7 illustrates a pack for receiving and accommodating an e-cigarette in accordance with some embodiments of the disclosure.

FIG. 7 illustrates a pack 100 for receiving and accommodating an e-cigarette 10 in accordance with some embodiments of the disclosure. The pack comprises a body 120 which is provided with a hinged lid 140 that can open and close. The body 120 comprises an outer case or housing 125 which is fitted with an insert 130. More particularly, the outer case 125 has an opening at the top, i.e. the end at which the lid is located, and the insert 130 is fitted into, and generally closes, this opening. The insert 130 itself is provided with two openings or holes that extend down into the body 120 of the pack 100. The first opening 132 comprises a substantially circular hole (in terms of cross-sectional shape). The first opening 132 is surrounded by an annular light element 133. The second opening 131 in the insert comprises a pair of linked holes (only one of which is easily visible in FIG. 7). The openings 132 and 131 (and more particularly, each of the pair of holes formed by opening 131) can be used to receive an appropriately shaped object, such as an e-cigarette, a spare or used cartridge, etc. The dimensions of pack 100 are generally arranged so that an e-cigarette accommodated within openings 132 or 131 protrudes slightly out of this opening. This allows a user to readily discern the contents of pack 100 (as also helped by making lid 140 transparent), and also facilitates removal by a user of an e-cigarette located within one of these openings.

The pack 100 is further provided with a set of LED lights 128. These are shown separated from the casing 125 in FIG. 7 in an exploded view, but in the assembled pack are integrated into the body 120 so as to lie flush with the outer casing 125. These LED lights 128 can be used to indicate the charging state of the pack 100, for example, whether it is fully charged, partly charged, or fully discharged. The LED lights 128 may also be used to indicate whether or not the pack 100 is currently charging (being charged). Such charging may be accomplished via a (mini or micro) USB link using a (mini or micro) USB connector located on the underside of the pack 100 (not visible in FIG. 7).

Figure 8:
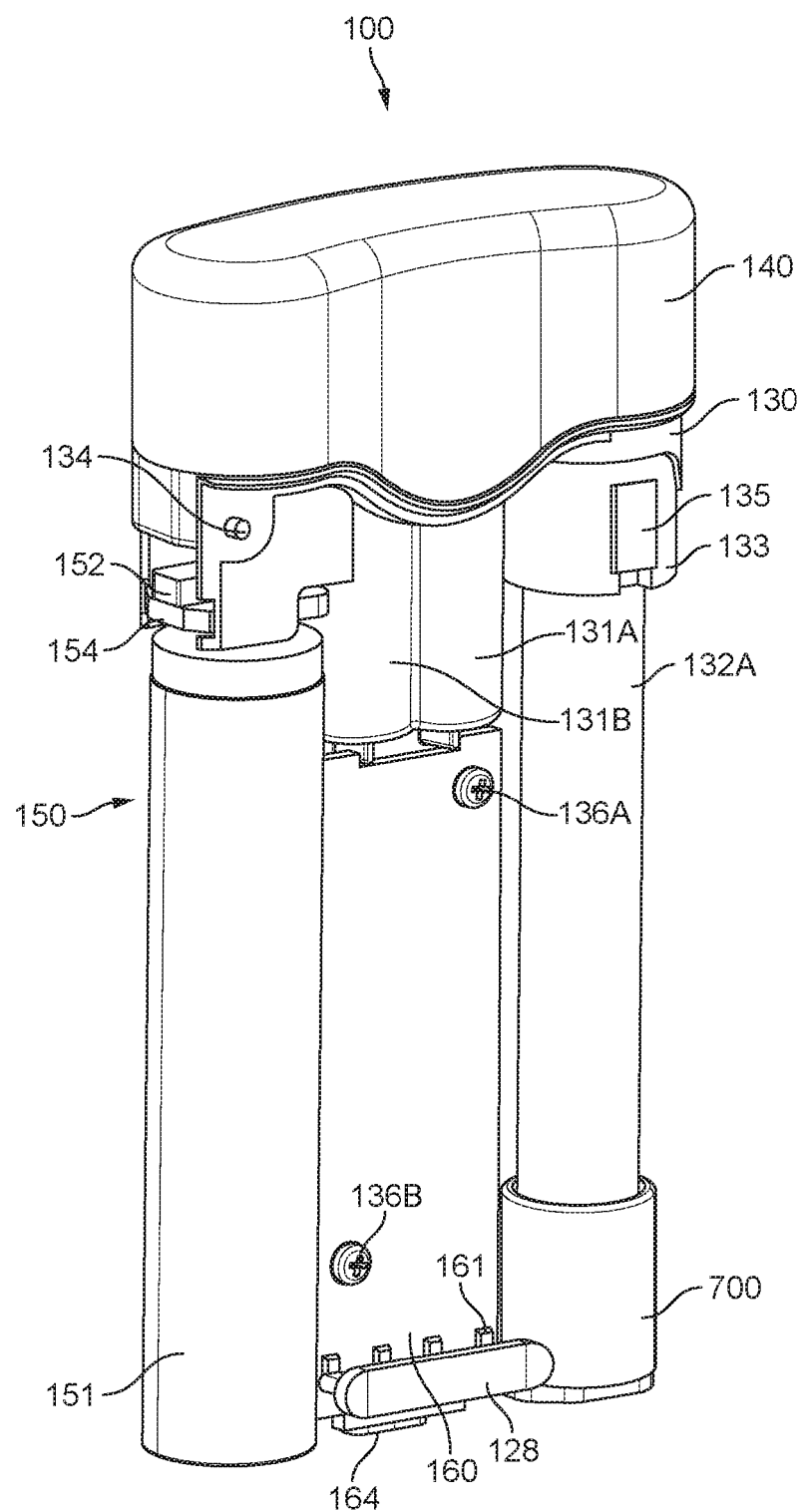
FIG. 8 illustrates the main components that are housed within the body of the pack of FIG. 7 in accordance with some embodiments of the disclosure.

FIG. 8 illustrates the main components that are housed within the body 120 of the pack 100, more particularly, within housing 125, in accordance with some embodiments of the disclosure (some minor components, such as internal wiring, are omitted for reasons of clarity). The body includes a battery unit 150 comprising a battery 151, a printed circuit board (PCB) 154, and a switch 152. The body 120 can be seen to include a hinge or axle 134, which provides a pivot about which the lid 140 is able to open and shut. The battery unit 150, including the switch 152, is located substantially below the hinge 134. The switch 152 is activated as the lid 140 is opened or closed, and this activation of the switch 152 then, in turn, is able to trigger activation of the LED lights, etc.

As illustrated in FIG. 8, the insert 130 extends substantially to the bottom of the outer casing 125. The insert defines a substantially cylindrical tube 132A extending down from opening 132 (see FIG. 7), which is able to receive and hold an e-cigarette. The insert 130 further includes two further substantially cylindrical tubes 131A, 131B, which overlap one another, extending down from opening 131 (see FIG. 7) with a "figure-of-8" cross-section. Note that the bottom of tubes 131A and 131B may be closed by the insert itself 130, or may be open, but abutting against the bottom of the outer casing 125, which would then have the effect of again closing the bottom of the tubes 131A and 131B in order to retain an e-cigarette (or other item, such as a spare cartridge, therein). The configuration of the bottom of the tube 132A is explained in more detail later on.

Note that the battery 151 is relatively large—comparable in size, for example, with the opening 132 and associated tube 132A for receiving an e-cigarette. Consequently the battery 151 of the pack 100 will usually have significantly greater electrical storage capacity than a battery provided in an e-cigarette which may be accommodated within the pack 100. This allows the battery in the e-cigarette to be re-charged, typically several times, using the battery unit 150 of pack 100, without the need for any additional, external power supply (such as a mains connection). This can be very convenient for a user, who may be in a location or situation which does not provide a ready connection to the mains power supply.

In order to support this re-charging of an e-cigarette stored within the pack 100, the bottom portion of the tube 132A is located within an e-cigarette connection assembly 700. The e-cigarette connection assembly 700 allows an electrical connection to be made between the pack 100 and the electrical contacts 900A, 900B on the cap 225 of the e-cigarette when the e-cigarette is inserted into the tube 132A, thus allowing the e-cigarette battery to be charged using the pack battery 151. This is explained in more detail below.

The insert 130 is provided with printed circuit boards (PCBs) 135 and 160. The PCB 160 provides the main control functionality of the pack and is attached to tubes 131A, 131B by screws 136A, 136B, thereby retaining the PCB in the appropriate position relative to the tubes 131A, 131B. A mini-USB (or micro-USB) connector 164 is provided at the bottom of the PCB 160, and is accessible through a corresponding aperture in the underside of the housing 125 of the pack body 120. This USB connector 164 can be used to connect an external power supply to the pack 100 for re-charging the battery 151 (and also any e-cigarette located in tube 132A). The USB connector 164 may also be used, if so desired, for communications with the electronics of the pack 100 and/or e-cigarette, for example to update software on the PCB 160 and/or to download usage data from the e-cigarette, etc. The PCB 160 is further provided with a set of physical and mechanical connectors 161 for retaining and operating the LED lighting 128. In particular, the PCB 160 controls the LED lighting element 128 to provide an indication to a user about the current charging situation of the pack 100, plus any other suitable information.

The PCB 135 is located on the outside of re-charging tube 132A, relatively near the top, i.e. closer to the hole or opening 132 for receiving an e-cigarette for re-charging. This PCB 135 incorporates at least one light emitting diode (LED), which is used to illuminate the annular light element 133. The PCB 135, LED and annular light element 133 are used to provide an indication to a user about the current charging situation of an e-cigarette located within tube 132A pack 100, plus any other suitable information.

Figure 9A:
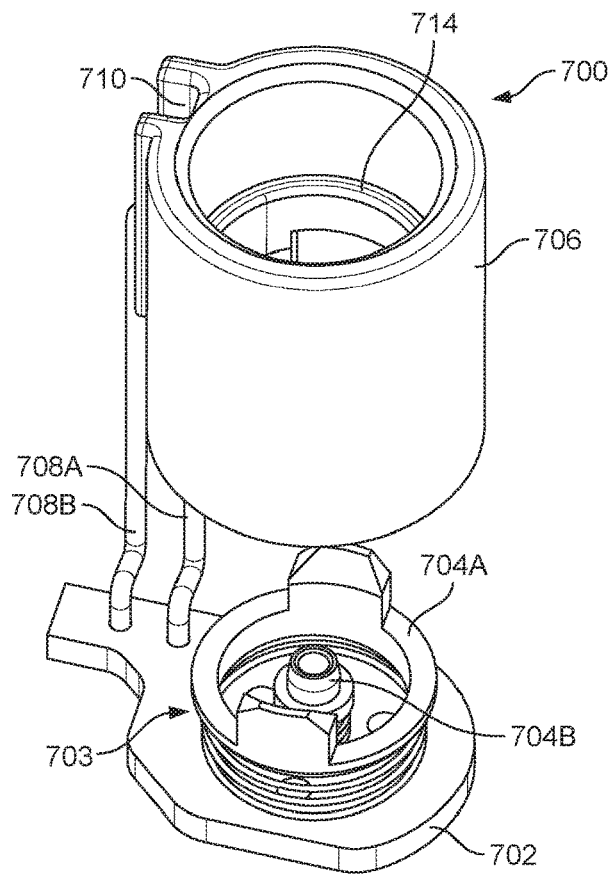
FIGS. 9A and 9B illustrate (in an exploded view) an e-cigarette connection assembly 700 of the pack of FIG. 7 in accordance with some embodiments of the disclosure.
Figure 9B:
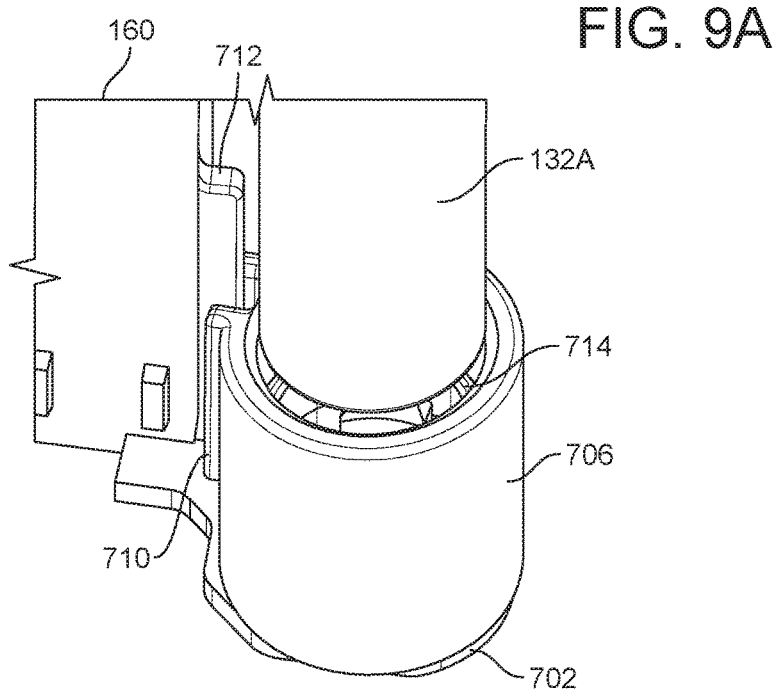

FIGS. 9A and 9B show (in an exploded view) the e-cigarette connection assembly 700 in more detail in accordance with some embodiments of the disclosure. The e-cigarette connection assembly 700 comprises a base 702, which is located on the base of the pack 100, and a connector 703, which has two electrical contacts 704A, 704B for making an electrical connection with the electrical contacts 900A, 900B on the cap 225 of the e-cigarette 10 when the e-cigarette 10 is inserted into the tube 132A. Specifically, the outer electrical contact 704A makes an electrical connection with electrical contact 900A on the e-cigarette 10 and the inner electrical contact 704B makes an electrical connection with the electrical contact 900B on the e-cigarette 10. The electrical contacts 704A, 704B are connected to the PCB 160 via wires 708A, 708B and, under the control of the PCB 160, act as positive and negative electrodes for charging the e-cigarette 10 with power supplied from the battery 151. The electrical contacts 704A, 704B are spring-mounted on the base 702 so as to ensure good electrical connection with the electrical contacts 900A, 900B on the cap 225 of the e-cigarette. Electrical conductors connecting the electrical contacts 704A, 704B and the wires 708A, 708B may extend along the surface of the base 702 or may extend through a bore through the base 702, for example.

The e-cigarette connection assembly 700 further comprises a cylindrical tube 706 which is fixed to the base 702. A portion of the cylindrical tube 706 is configured to receive an end portion of the tube 132A. The inner diameter of the portion of the cylindrical tube 706 which receives the end portion of the tube 132A is set such that the outer surface of the end portion of the tube 132A frictionally engages with the inner surface of the cylindrical tube 706. The inner surface of the cylindrical tube 706 further comprises a rib 714 which abuts the end of the tube 132A and ensures that only an end portion of the tube 132A having a predetermined length is able to enter the cylindrical tube 706. The cylindrical tube 706 further comprises a groove 710 on its outer surface which engages with a rib 712 on the PCB 160.

When the insert 130 and e-cigarette connection assembly 700 are inserted into the outer case 125, the base 702 abuts the bottom inner surface of the outer case 125. The insert 130 and e-cigarette connection assembly 700 are held in place within the outer case 125 (and also in relation to one another).

It will be appreciated that the configuration and arrangement of the pack 100 and insert 130 shown in FIGS. 7, 8 and 9 are provided by way of example, and the skilled person will be aware of many potential variations—e.g. the number, position, size and/or shape of holes 131, 132 may vary from one embodiment to another, likewise the associated tubes 131A, 131B, 132A. Similarly, the details of the positioning, shape and size of the battery unit 150, PCB 160, and other components will generally vary from one embodiment to another, depending upon the particular circumstances and requirements of any given implementation. It is also noted that the shape and positioning of the electrical contacts 704A, 704B will be adapted according to different shape and positional configurations of electrical contacts 900A, 900B on the e-cigarette 10.

The configuration and arrangement of the pack 100 and insert 130 as described above generally provide significant ease of use and convenience for a user. Thus the e-cigarette 10 can be quickly entered into pack 100 for storage when not in use. Furthermore, while stored in the pack 100, the e-cigarette 10 can be re-charged without requiring any disassembly of the e-cigarette 10. In other words, the re-charging can use connector 900 rather than connector 25B, hence there is no need to separate or disassemble the body 20 from the cartomizer 30. Consequently the e-cigarette 10 is then available for immediate use when so desired—e.g. without first having to disengage connector 25B from a complementary USB charging connector and then having to re-engage connector 25B on the body 20 with connector 25A on the cartomizer.

Nevertheless, it has been recognized there are some potential issues arising from this ease of use and convenience. Firstly, although it is very quick to insert an e-cigarette 10 into tube 132A for re-charging, there may also be a risk that some other (foreign) object is inserted into tube 132A, whether by accident or perhaps deliberately. Note that the connection between the e-cigarette connector 900 and the pack connector 703 at the bottom of tube 132A depends only on gravity, potentially enhanced by downward pressure onto the e-cigarette from pack lid 140 when closed (rather than involving some additional user manipulation, such as required by the bayonet fitting between the body 20 and the cartomizer 30 for joining connectors 25A and 25B together, or such as twisting for a screw fitting, or the required insertion force for a USB plug). Accordingly, a foreign object located within tube 132A may form an electrical connection with connector 703 at the bottom of the pack 100. Depending upon the nature and material of the foreign object, this may, for example, cause a short circuit across connector 703. This can lead to potential overheating of the foreign object, including a possible fire risk, and also overly rapid depletion of the pack battery 151.

Secondly, because the pack 100 acts both as a container for storing and carrying the e-cigarette 10 when not in use, and also as a re-charging system, the e-cigarette 10 will therefore connect to the re-charging system on a frequent basis—in effect, after every use by a user. In contrast, with a dedicated USB re-charger, which does not provide convenient storage for the e-cigarette, the user will typically only re-charge the pack when the battery is depleted, or at least significantly depleted. However, conventional lithium ion batteries generally have a limited lifetime in terms of number of re-charging cycles, after which they start to degrade and have lower storage capacity. Although this number of re-charging cycles may be high, typically between 300 and 600, such a limit might be reached in months if a battery is re-charged every day.

Figure 10:
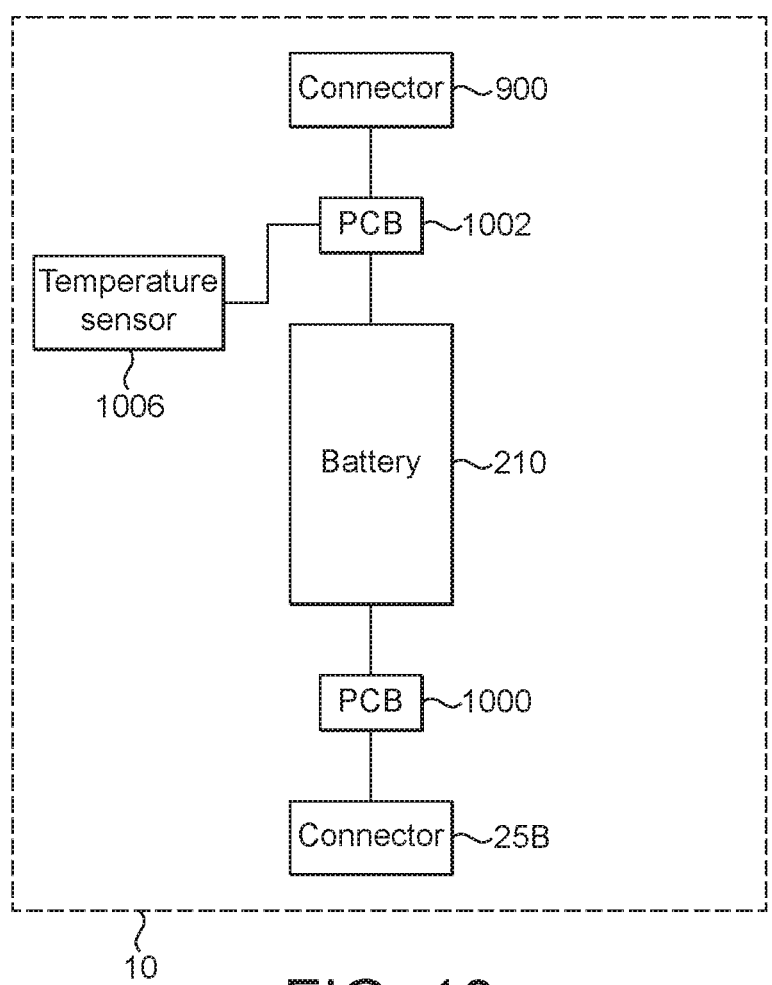
FIG. 10 is a schematic diagram of safety components of the e-cigarette of FIG. 1 in accordance with some embodiments of the disclosure.
Figure 11:
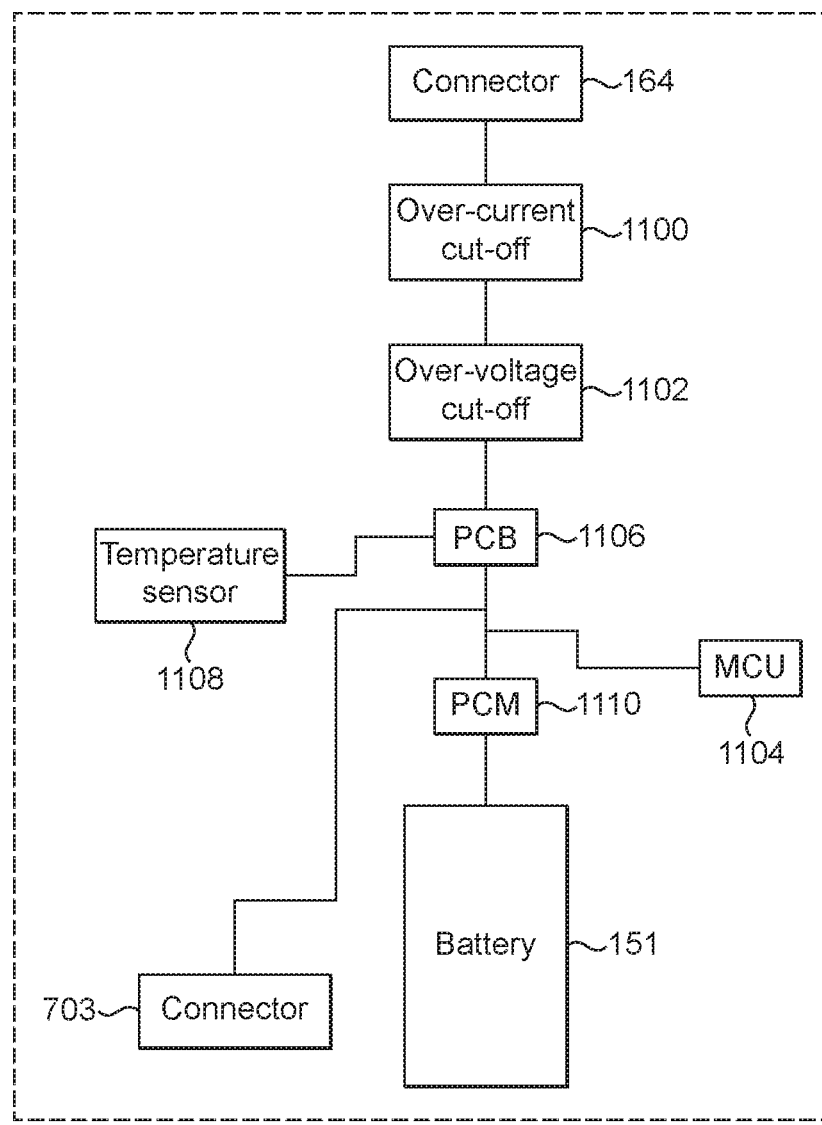
FIG. 11 is a schematic diagram of safety components of the pack of FIG. 7 in accordance with some embodiments of the disclosure.

FIGS. 10 and 11 schematically show some components of the e-cigarette 10 and pack 100, respectively, in accordance with some embodiments of the disclosure. These components help to improve the safety and reliability of the various charging mechanisms provided for the e-cigarette 10 and pack 100, including with regard to the two particular concerns identified above.

FIG. 10 schematically depicts some electrical components of the e-cigarette 10. In addition to the connector 900, battery 210 and connector 25B, which have already been discussed in relation to FIGS. 5 and 6, FIG. 10 also shows a tip charge PCB 1002, a temperature sensor 1006, and an over-current protection PCB 1000. It is noted that for the sake of clarity, not all electrical components of the e-cigarette 10 are included in FIG. 10—e.g. some of the components already shown in FIG. 6 have been omitted.

The over-current protection PCB 1000 monitors the current flowing through the connector 25B during operation of the e-cigarette 10. It is recalled that, during use of the e-cigarette 10, the CPU 550 detects when a user is drawing air through the e-cigarette 10 using information from the sensor unit 215 and causes current to flow to the heater 365 in the cartomiser 30 via the connector 25B. If there is a short circuit at the heater 365, for example, there will be a sudden increase in current flowing through the heater 365 and connector 25B. The short circuit might occur for reasons such as an electrical fault at the heater 365, the heating circuit having been tampered with, excessive moisture making contact with the heater, etc. A short circuit of the heater may risk damage occurring to the e-cigarette device 10 or, worse, injury to the user.

Accordingly, the over-current protection PCB 1000, upon detection of a current through the connector 25B which is deemed too high (that is, above a certain predetermined threshold), causes the supply of current from the battery 210 to the connector 25B to be cut. This reduces the chance of damage to the e-cigarette 10 and of injury to the user due to such a short circuit.

The predetermined current threshold is set such that dangerously high currents indicative of a short circuit are cut off, but normal, non-dangerous variations in the current are not cut off (thus avoiding unnecessary inconvenience to the user). For example, the threshold for the current supply from the battery 210 to the heater 365 may be set somewhere in the range 40-250 milliAmps, or more precisely, in the range 60-120 milliAmps, such that any current greater than this threshold amount triggers a circuit cut off.

The PCB 1000 may also cut off if the voltage of the battery 210 is too low, for example, below about 3.1 or 3.2V. This generally indicates that the battery is in a state of low charge, and this could potentially prevent correct (or satisfactory) operation of the heater coil.

The over-current protection PCB 1000 may also monitor current flowing through the connector 25B, and/or voltage applied at connector 25B, during re-charging of the e-cigarette 10 via USB connector 25B. For example, the expected voltage applied by a USB charger to the USB connector 25B may be 5V, so that the over-voltage cut-off might be set, by way of illustration, at 6V. The over-current protection PCB 1000 therefore provides protection for the e-cigarette 10 both during re-charging (against excessive re-charging voltage), and also during normal operation (against excessive current draw).

The tip charge PCB 1002 acts as a controller for monitoring and controlling power flow from the pack 100 to the e-cigarette battery 210 during re-charging. For example, the tip charge PCB may cut off the power flow from the pack 100 to the battery 210 if the voltage and/or current received via connector 900 is too high—e.g. exceeds a predetermined threshold for voltage or current. The thresholds can be set to tolerate the full range of normal operating conditions, but to trigger (cut off) before a level that might start to cause damage to the e-cigarette 10.

The tip charge PCB 1002 is connected to the temperature sensor 1006. The temperature sensor 1006 is in thermal contact with the battery 210 so as to be responsive to the temperature of the battery 210. (Thus temperature sensor 1006 is normally an additional device to temperature sensor 563 shown in FIG. 6, since the former is positioned to measure the temperature of the battery 210, while the latter is positioned to measure the temperature of the airflow into the e-cigarette.)

As the battery 210 is (re)charged using the connector 900 (that is, when the e-cigarette 10 is inserted into the tube 132A of the pack 100 so that the connector 900 makes electrical contact with the connector 703 of the pack), the battery will normally heat up. However, if the battery 210 gets too hot (perhaps due to a fault in the battery or because the ambient temperature is very warm), this may cause damage to the e-cigarette 10, to the pack 100 or, worse, injury to the user. Also, if the battery 210 is very cold (perhaps due to the ambient temperature being very cold), then attempting to charge the battery 210 may cause damage to it. Thus, the tip charge PCB 1002 monitors the temperature of the battery 210 using information generated by the temperature sensor 1006. If the temperature gets too hot (that is, above a predetermined upper threshold) or too cold (that is, below a predetermined lower threshold), the tip charge PCB 1002 cuts off the current supply to the battery 210 from the connector 900. This reduces the chance of damage to the e-cigarette 10 or pack 100 or of injury to the user due to the battery 210 overheating, as well as reducing the chance of damage to the battery 210 by charging it when it is too cold.

The predetermined upper temperature threshold is set such that high temperatures indicative of potential battery overheating result in current to the battery 210 being cut off, whereas lower increases in battery temperature do not result in the current to the battery 210 being cut off. Similarly, the predetermined lower temperature threshold is set such that low temperatures which could damage the battery 210 result in current to the battery 210 being cut off, whereas smaller reductions in battery temperature do not result in current to the battery 210 being cut off. Examples of the upper and lower temperature thresholds are about 60° C. and about 0° C., or about 45° C. and about 10° C., respectively.

The tip charge PCB 1002 also ensures that current is only supplied to the battery 210 for a predetermined time period before the current is cut off. This ensures that the battery 210 is not subjected to overcharging, in which the battery 210 continues to be charged even though it is already at full capacity (which might damage the battery 210). The predetermined time period is set so that the battery can be charged to its full capacity (maximizing the length of time that the user can use the e-cigarette 10 without having to recharge it), but also avoiding overcharging of the battery 210. For example, the predetermined time period may be set somewhere in the range 1 to 4 hours, such as between 1 and 2 hours.

Overall therefore, the over-current protection PCB 1000 and/or the tip charging PCB 1002 provide protection based on the parameters or dimensions set out below.
- time—there is a threshold for a maximum re-charge duration.
- temperature—there are upper and lower thresholds for a maximum and minimum battery temperature respectively. These thresholds are applied in particular when battery 210 is being re-charged, but may also be applied during normal operation of the device—i.e. when the user is inhaling through e-cigarette 10 to activate heater 365 and produce vapor output.
- voltage—there is a threshold for a maximum voltage applied during re-charge.
- current—there is a threshold for a maximum current flowing during re-charge and/or for a maximum current flowing from the body 20 to the cartomizer 30 during normal operation of the e-cigarette 10.

In the event that any of the above thresholds is breached, then the re-charge (or operation of the device as appropriate) can be terminated by activating a suitable cut-off. It will be appreciated that protection for each of the above four parameters or dimensions may generally be implemented as appropriate in the over-current protection PCB 1000 and/or in the tip charge PCB 1002, where the former relates to the re-charge or normal operation through connector 25B, while the latter relates to re-charge through connector 900.

Note that there is certain overlap or redundancy between the different dimensions of the protection. For example, the cut-off of the current supply to the battery 210 after a predetermined time period has elapsed will generally help to reduce the chance of the battery 210 becoming too hot during re-charging. However, this overlap gives greater protection, since if, for any reason, the temperature-monitoring function does not work correctly, then because current is only supplied to the battery 210 for the predetermined time period (rather than indefinitely), this may still prevent the battery from overheating.

The tip charge PCB 1002 may also act to help preserve the operational lifetime of the battery 210. Thus when the e-cigarette battery 210 is placed into the pack, tip charge PCB 1002 may detect the current voltage of the battery 210, and if this exceeds a predetermined charging threshold, the battery is not re-charged. In other words, in such circumstances, the tip charge PCB prevents the battery 210 from receiving external power from the pack 100 (akin to the situation if the PCB 1002 receives an out-of-spec temperature reading from the temperature sensor 1006).

If we assume that the battery 210 has a maximum voltage of 4.2V when fully charged, which is typical for a lithium ion battery, then the predetermined charging threshold may be in the range 4.0-4.1V, for example, 4.05V. At this level of charge, the battery 210 will generally appear to the user as fully charged. Furthermore, recharging back up to 4.2V will not deliver any significant increase in usage for the consumer, but may over time diminish the state of the battery. Thus the additional re-charging (if the threshold were not utilized) would tend to increase the rate of aging of the battery 210, especially since repeated charging near the maximum voltage level of the battery tends to be most deleterious for the battery lifetime.

It will be appreciated that there are various ways for setting the predetermined charging threshold. For example, the predetermined charging threshold may be specified as an absolute voltage, or it may be specified relative to the maximum voltage of battery 210. One possibility is that the predetermined threshold may be defined as a certain proportion of the maximum voltage, e.g. the predetermined threshold may be in the range 90-98%, 92-96%, or approximately 95% of the (nominal) maximum voltage. Thus if the predetermined charging threshold is 95% and the maximum voltage is 4.2V, then no (re)charging is performed if the voltage of battery 210 is above 3.99V. Another possibility is that the predetermined threshold may be defined as an offset from (below) the maximum voltage, e.g. the predetermined threshold may be an offset in the range 0.1-0.25V or 0.15-0.2V. Thus if the predetermined charging threshold is, for example, 0.15V below the (nominal) maximum voltage of 4.2V, then no (re)charging will be performed if the voltage of battery 210 is above 4.05V.

This functionality to protect the battery lifetime may be implemented in a different location from the tip charge PCB 1002, depending upon the requirements of any given implementation. For example, the functionality may be incorporated into the microcontroller 555 of the e-cigarette 10. A further possibility is that the functionality is incorporated into the pack 100 (instead of, or possibly in addition to, implementing the functionality in the e-cigarette 10 itself). This is discussed in more detail below.

More generally, the various functionality shown in FIG. 10 may be implemented using separate components. For example, the tip charge PCB 1002 may be implemented as a separate component such as a BQ24040 PCB from Texas Instruments (this can help support the use of off-the-shelf components). Alternatively, one or both of the tip charge and over-current protection PCBs 1002, 1000, may be integrated as part of the microcontroller 555 (see FIG. 6). A further possibility is that the tip charge and over-current protection PCBs 1002, 1000 are integrated together into a single device which is separate from the microcontroller 555.

As described above, the e-cigarette is provided with two contacts that can be used for re-charging, namely connector 900 (for charging via pack 100), and also connector 25B, which can be used for charging via a (micro) USB connector when the e-cigarette 10 is in a disassembled state (the body 20 and cartomizer 30 separated). Connector 25B can also be used for supplying power from the body to the cartomizer when the e-cigarette is in an assembled state. The tip charge PCB 1002 provides protection and control in relation to charging the e-cigarette via connector 900. The over-current protection PCB 1000 provides protection and control in relation to supplying power from the body 20 to the cartomizer.

The over-current protection PCB 1000 may also provide protection and control in relation to charging the e-cigarette from an external power supply via connector 25B, analogous to the protection provided by tip charge PCB 1002 when re-charging via connector 900. For example, this protection and control may involve monitoring the current and/or voltage supplied from connector 25B, and cutting off the power supply to the battery if the current or voltage exceeds a respective limit. Further, the over-current protection PCB may cut off power if the duration (time) of charging exceeds some threshold level, or if the temperature of the e-cigarette is too hot or too cold. Note that over-current protection PCB 1000 may have access to temperature sensor 1006 for making this latter determination, or may be provided with its own, additional temperature sensor (not shown in FIG. 10).

FIG. 11 schematically shows some electrical components of the recharge pack 100 in accordance with some embodiments of the invention. In addition to the connector 164, battery 151 and connector 703, as already discussed in relation to FIGS. 8 and 9, FIG. 11 also shows an over-current cut-off unit 1100, an over-voltage cut-off unit 1102, a multipoint control unit (MCU) 1104, a regulator PCB 1106, a temperature sensor 1108 and a protection circuit module (PCM) 1110. Similar to FIG. 10, certain components of the pack 100 have been omitted from FIG. 11 for the sake of clarity.

The pack 100 supports three main charging operations (modes). (1) When the connector 164 is electrically connected to a power source (such as a USB charging device), power flows from the power source via the connector 164 to the battery 151. This allows the battery 151 to be charged. (2) When the connector 164 is electrically connected to a power source (such as a USB charging device), power also flows from the power source via the connectors 164 and 703 to an e-cigarette 10 (if present). This allows the battery 210 of the e-cigarette 10 to be charged (simultaneously with the pack battery 151). (3) When the connector 900 of an e-cigarette 10 is electrically connected to the connector 703, but there is no external power supply for the pack at connector 164, power flows from the battery 151 to the e-cigarette 10 via the connector 703. This allows the battery 210 of the e-cigarette 10 to be charged. These power flows are generally controllable by one or more of the over-current cut-off 1100, over-voltage cut-off 1102, regulating PCB 1106, PCM 1110 and MCU 1104. The control of the battery charging and e-cigarette charging power flows will now be described in more detail.

The regulating PCB 1106 is the principal controller of power for charging the battery 151 in that it regulates the current and voltage supplied to the battery 151 during charging. In some embodiments, the regulating PCB 1106 is implemented using a MicrOne ME4057 device; however, other implementations may use different devices (or may integrate the functionality of the regulating PCB 1106 into other components).

The current and voltage are regulated by PCB 1106 such that they remain substantially constant at predetermined values, which are selected to provide efficient, timely and safe charging of the battery 151 and to help enhance or at least maintain the battery's long-term lifespan (the long-time lifespan being related to the total number of times a rechargeable battery can be charged and recharged before it starts permanently losing its capacity).

When the battery 151 is a lithium ion (Li-ion) battery, the predetermined values of the current and voltage may be about 400-500 mA and about 4.2V respectively during charging. The predetermined values may also change over the course of a single battery charge. For example, when the battery 151 is first charged, the predetermined value of the current may be lower. Then, at a later time, when the battery has stored a certain amount of charge, the predetermined value of the current may be stepped up to about 400-500 mA, as above. This prevents the battery 151 from being subjected to a relatively large current when it is completely discharged (or close to being completely discharged), which might otherwise cause damage to the battery and reduce its long-term lifespan. Other implementations may have a different maximum current or voltage supply, such as somewhere in the region 250-600 mA and somewhere in the region 3-6V (respectively).

The regulating PCB 1106 is also connected to the temperature sensor 1108. The temperature sensor 1108 is in thermal contact with the battery 151 so as to be responsive to the temperature of the battery 151. As the battery 151 is charged using power supplied via the connector 164, the battery will normally heat up. However, if the battery 151 gets too hot (perhaps due to a fault in the battery 151 or because the ambient temperature is very warm), this may cause damage to the battery 151 or pack 100 or, worse, injury to the user. Also, if the battery 151 is very cold (perhaps due to the ambient temperature being very cold), then attempting to charge the battery 151 may also cause damage to the battery 151. Thus, the regulating PCB 1106 monitors the temperature of the battery 151 using information provided by the temperature sensor 1108. If the temperature gets too hot (that is, above a certain predetermined upper threshold) or too cold (that is, below a predetermined lower threshold), then the regulating PCB 1106 cuts off the current supply to the battery 210. This reduces the chance of damage to the battery 151 or pack 100 and of injury to the user due the battery 151 overheating, and reduces the chance of damage to the battery 151 by charging it when it is too cold.

The predetermined upper temperature threshold is set such that high temperatures indicative of battery overheating result in current to the battery 151 being cut off, but normal (routine) increases in battery temperature, which do not risk damage, do not result in current to the battery 151 being cut off. Similarly, the predetermined lower temperature threshold is set such that for low temperatures, which might result in damage to the battery 151, the current to the battery 151 is cut off. However, falls in battery temperature that remain within the specified normal operating limits do not result in current to the battery 151 being cut off. Examples of the upper and lower temperature thresholds are about 45° C. and about −5° C., respectively. However, for some batteries, the upper temperature threshold may be up to about 60° C. and the lower temperature threshold may be down to about −20°

C. Typically the upper threshold is in the range 45 to 60° C., while the lower threshold is in the range 0 to −20° C.

In some implementations, the pack 100 may be provided with a temperature sensor that measures ambient temperature within the pack (typically close to the location of any re-charging e-cigarette 10 inside the pack). Again, this sensor may trigger a power cut-off if the temperature is found to rise above a certain threshold, such as 50° C. Note that such a temperature sensor may be provided in addition to or instead of temperature sensor 1108 as shown in FIG. 11 (which is intended to measure primarily the temperature of the battery 151).

The regulating PCB 1106 may also perform the voltage check on the e-cigarette 10 mentioned above. In particular, the regulating PCB 1106 may detect the voltage level of battery 210 within the e-cigarette 10, typically based on the voltage appearing on contacts 900A, 900B as connected to connector 703, and then decide to supply power to the e-cigarette 10 to re-charge the battery 210 providing the voltage level of battery 210 is not already above the predetermined charging threshold (which may be set in the various manners described above for e-cigarette 10). This charging threshold protection may also be implemented by some other component in the pack 100 (other than regulating PCB 1106).

In addition to the current and voltage control implemented by the regulating PCB 1106, the pack 100 is provided with further safeguards against excessive voltages or currents that are too high and which may therefore cause damage to the battery 151 or other components of the pack (or injury to the user). For example, pack 100 also includes the over-current cut-off unit 1100 and the over-voltage cut-off unit 1102.

The over-current cut-off unit 1100 cuts off the power supplied from the connector 164 to the other components of the pack 100 (including the regulating PCB 1106) when it detects that the current exceeds a predetermined threshold. Even though the current supplied to the battery 151 is regulated by the regulating PCB 1106 (as already described), the over-current cut-off unit 1100 provides an extra layer of protection to the battery 151 and other pack components. For example, the over-current cut-off unit 1100 helps to reduce the risk of damage to the components of the pack in the case that too much current is supplied via the connector 164 (this could happen, for example, if an unsuitable charging device which supplies too much current is connected to the connector 164, or if one of the components of the pack short circuits).

The over-current cut-off unit 1100 may be implemented, for example, using a thermal resettable fuse, which trips out by entering a high impedance state when the current exceeds the predetermined threshold. At a later time, when the temperature cools down, the thermal resettable fuse re-enters a low impedance state again, thereby allowing current to flow again (so that use of the pack 100 may be resumed). The predetermined current threshold is set such that a high current which might cause damage is cut off, but such that variations in the current within normal and acceptable operating parameters do not produce a cut-off. For example, the predetermined current threshold may be set at about 1 amp.

The over-voltage cut-off unit 1102 cuts off the power supplied from the connector 164 to the other components of the pack 100 (including the regulating PCB 1106) if it detects that the supply voltage has exceeded a predetermined threshold. Even though the voltage supplied to the battery 151 is regulated by the regulating PCB 1106 (as described above), the over-voltage cut-off unit 1100 provides an extra layer of protection for the battery 151 and other pack components, thus reducing the risk of damage to the components in the pack (or potential injury to the user) in the case that too high a voltage is supplied via the connector 164. Such a high voltage might occur, for example, if an unsuitable charging device that supplies too high a voltage were to be connected to the connector 164. The predetermined voltage threshold is set such that a dangerously high voltage is cut off (i.e. one that might damage the device, or possibly cause injury to a user), but variations of the voltage within the normal (non-dangerous) operating range are not cut off. For example, the predetermined voltage threshold may be set at about 6V, thereby ensuring that a 5V USB charging device will not trigger the over-voltage cut-off unit 1102, but that higher voltages will trigger the over-voltage cut-off unit 1102.

The PCM 1110, which sits between the regulating PCB and the battery 151, monitors the current and voltage between the battery 151 and other components of the pack (including the regulating PCB 1106) and trips the electrical connection between the battery 151 and the other pack components in the case that the current or voltage moves outside a predetermined current or voltage range (respectively). This monitoring is performed both for charging the battery 151 (from an external power supply via connector 164), and also for discharging the battery 151 (to supply power to battery 210 in the e-cigarette 10 via connector 703, as well as to other components in the pack, such as lighting 128). In particular, during charging or discharging of the battery 151, if either the current or voltage exceeds a predetermined upper threshold, then the electrical connection between the battery 151 and other pack components is tripped (cut off), i.e. the flow of power between the battery 151 and the other pack components is prevented or at least very significantly reduced. This helps to reduce the risk of too much current or voltage being supplied to or from the battery 151 and the problems associated with this (such as damage to the battery 151 and/or other components, injury to the user, etc.). The threshold for the over-voltage may be set, for example, at about 4.3V, while the threshold for over-current may be set, for example, in the range 1.5-2.5 amps, e.g. at about 1.8 amps.

Also, during discharging of the battery 151, e.g. to re-charge battery 210 in the e-cigarette 10, if the voltage from the battery 151 falls below a predetermined lower threshold, then the electrical connection between the battery 151 and the other pack components, such as connector 703, is cut off. This helps to prevent damage to the battery 151 that might otherwise occur due the continued drawing of current from the battery when it has a low remaining capacity and is outputting a low voltage (this can happen with certain rechargeable batteries such as Li-ion batteries).

The PCM 1110 may comprise a separate PCB or may (for example) be integrated as part of the battery 151. Due to the position of the PCM 1110 within the electrical circuit (that is, between the battery 151 and other pack components), the PCM 1110 is able to detect voltage/current abnormalities which may not be detectable by the other voltage/current-controlling pack components (such as the regulator PCB 1106, over-current cut-off unit 1100 and over-voltage cut-off unit 1102). The PCM 1110 thus adds an extra layer of protection against the risk of damage to the battery 151 or any of the other pack components (or e-cigarette 10), and against potential injury to the user caused by abnormal current or voltage values.

The PCM 1110 may comprise any standard PCB suitable for detecting whether or not an applied voltage and/or current is within certain predetermined limits. Furthermore, the PCM 1110 may comprise a metal-oxide-semiconductor field-effect transistor (MOSFET) for detecting when the current exceeds the predetermined current threshold.

The MCU 1104 ensures that current is only supplied to the battery 151 during charging for a predetermined time period before it is cut off. This helps to ensure that the battery 151 is not subject to overcharging, in which the battery 151 is continuously charged even though it is at full capacity (this may damage the battery 151). The predetermined time period is set to allow the battery to be charged to its full capacity (thereby maximizing the length of time between charges for which the user can use the pack 100, such as to recharge the e-cigarette 10), but also avoiding overcharging of the battery 151. For example, the predetermined time period may be set somewhere in the range 2 to 8 hours, such as between 4 and 6 hours.

The cut-off of the current supply to the battery 151 after the predetermined time period has elapsed may also help reduce the chance of the battery 151 becoming too hot or too cold. Although this is managed by the temperature-monitoring function of the regulating PCB 1106 (as already described), if, for any reason, the temperature-monitoring function does not work correctly, then, because current is only supplied to the battery 151 for the predetermined time period (rather than indefinitely), the above-discussed problems associated with continuously supplying current to the battery 151 when it is too hot may at least be alleviated.

The MCU 1104 also ensures that current is only supplied from the battery 151 during charging of an e-cigarette 10 via the connector 703 for a predetermined time before it is cut off. This provides an extra layer of protection to help prevent overcharging of the battery 210 of the e-cigarette 10 (in addition to the timed current cut-off function of the tip charge PCB 1002 of the e-cigarette 10 itself, as described above). For example, the predetermined time period may be set somewhere in the range 2 to 6 hours, such as between 3 and 5 hours. Note that this cut-off applies irrespective of whether the current is being supplied to the e-cigarette 10 via the external power source and connector 164 or from the pack battery 151.

The overcharging of the e-cigarette battery 210 may be avoided primarily by the predetermined e-cigarette charge time of the tip charge PCB 1002, with the predetermined e-cigarette charge time of the MCU 1104 then being set at the same or a somewhat larger value so as to act as a back-up in the event that the timer of the MCU 1104 experiences a fault and fails to cut off the current at the appropriate time. Thus, overcharging of the e-cigarette 10 can be avoided even if there is a failure in the timer function of the e-cigarette 10.

A further protection mechanism implemented in the pack is to address the concern noted above that a foreign object can be introduced relatively easily into tube 132A. Furthermore, the foreign object may form an electrical connection with re-charge connector 703, especially since this does not require any particular manipulation, such as screwing—(rather such connection can be formed just by gravity. Depending on the nature of the foreign object, this may potentially lead to (excessive) current being supplied through connector 703 to the foreign object, which might therefore overheat.

In order to provide protection against such a foreign object, the pack monitors the charging current provided to the e-cigarette 10 via connector 703. This monitoring may be done, for example, by MCU 1104 or PCM 1110, or by some other component (not shown in FIG. 11) that sits directly on the circuit path to connector 703.

The typical (nominal) charging current from the pack 100 to the e-cigarette 10 is in the range 75-100 milliAmps (mA). A protection threshold is set sufficiently higher than this normal charging level, for example at 200 mA, to allow for charging within the normal operating range plus a reasonable margin, but to minimize the risk of an excessive current supply to (and hence overheating in) the object being charged. It will be appreciated that this protection threshold may be set in various manners, such as by using an absolute voltage level (such as 200 mA); or by using an offset from the nominal charging current (such as an excess current of 100 mA or more above the nominal charging current); or by using a relative offset from the nominal charging current (such as an excess current of 100% or more in relation to the nominal charging current).

If the measured (monitored) current exceeds the specified protection threshold, then the protection mechanism triggers to cut out the current to the connector 703. Note that this cut-out not only provides a safety mechanism against a foreign object being inserted into tube 132A, but it also provides a safety mechanism against a faulty e-cigarette 10 being inserted for re-charging into tube 132A, e.g. an e-cigarette in which a short circuit has somehow developed (the temperature sensor 1006 also provides some protection against such a faulty e-cigarette 10).

This protection threshold may be implemented, for example, using a thermal resettable fuse, such as discussed above in relation to over-current cut-off 1100. When the protection threshold is exceeded, this may be indicated to the user as a fault condition on the pack by using lights 128 with an appropriate (predetermined) spatial and/or temporal pattern of illumination (other fault conditions discussed above may be indicated with other patterns of illumination).

The re-setting of this protection threshold and associated cut-off is activated in some embodiments by switch 152 (see FIG. 8), which detects opening and closing of the pack lid 140. For example, if the lid 140 of pack 100 is closed at the point of cut-off, then it is clear that the lid must be opened in order to remove any foreign body from the tube 132A. Therefore, re-setting of the protection threshold may be achieved by opening the lid. Note that in some embodiments, charging of the e-cigarette 10 in pack 100 may only commence once the lid has been closed, again as detected by switch 152. Thus re-setting the protection mechanism by opening the lid does not activate charging per se, but rather enables charging when the lid is next closed. It will be appreciated that various other reset mechanisms are feasible, for example, an external user-activated reset switch, or an external user-activated on-off switch for the pack (switching off and then on again to reset).

The foreign object protection set out above can be regarded as a form of passive or indirect detection, in that the protection only triggers if an excess current is taken through connector 703. Another form of passive or indirect detection may be to provide a sensor to monitor the temperature in or close to the tube 132A, thereby looking for an excess temperature as an indication that some foreign body (or possibly a defective e-cigarette) may be present in tube 132A. It is also possible to provide a direct or active protection mechanism, in which a positive check is performed by the pack to ensure that an item inserted into the tube 132A is an e-cigarette 10. In contrast to the protection set out above, in which charging is initiated and continued unless a specific condition occurs (excess current), in this approach charging is not initiated (or perhaps initiated but then very quickly discontinued) unless a specific condition occurs—namely a positive outcome to this check.

There are various mechanisms by which such a check could be implemented. For example, the e-cigarette 10 includes a light ring located between the inner contact 900B and the outer contact 900A. The e-cigarette could be arranged to illuminate this light ring when external power is detected at the connector 900, and the pack could then be provided with a photosensor to detect this illumination. If the photosensor provides confirmation of the illumination, this confirms that the inserted device is an e-cigarette 10, and the power supply through connector 703 to connector 900 is continued. However, if no illumination is detected by the photosensor, this indicates that the inserted device is not an e-cigarette 10 (but presumably some foreign body), and the power supply through connector 703 to connector 900 is discontinued.

Overall therefore, the pack 100 of FIG. 11 may implement a large number of protection features such as: protection against high voltage and/or high current received from connector 164, and/or from power being supplied from connector 164 for too long; protection against the pack 100 and/or battery 151 having too high (or too low) a temperature (this protection is relevant for all 3 of the charging modes defined above); protection against high voltage and/or high current being supplied to an e-cigarette 10 via connector 703, and/or from power being supplied to the e-cigarette via connector 703 for too long (this current/voltage and timing protection can apply irrespective of whether the e-cigarette is being re-charged by an external power supply or by pack battery 151). There may also be a cut-off implemented by PCB 1106 if the voltage of pack battery 151 exceeds a predetermined level while the pack battery is re-charging (typically somewhere in the range 4.2-4.5V), or if the voltage of the pack battery 151 falls below a predetermined level while the pack battery is discharging (to the e-cigarette or other components of pack). This lower voltage may be set, for example, in the range 2-3V, such as approximately 2.5V. There may also be protection against the presence of a foreign body in the re-charging tube 132A, as described above.

It will be appreciated that there are many different potential implementations for such active protection. For example, lighting may be provided elsewhere on the e-cigarette 10 to indicate the presence of e-cigarette 10 in tube 132A (instead of or in addition to the tip lighting). A further possibility is that the external surface of the e-cigarette is provided with some particular marking (such as a bar code or logo) that can be recognized and validated by the pack. A further possibility is that the pack 100 and the e-cigarette 10 are provided with some suitable communications facility, e.g. a wireless Bluetooth link, or else some communications ability through connectors 703 and 900, whereby the pack is able to confirm the identity of the e-cigarette 10.

It will be appreciated that many variations in the implementation of e-cigarette 10 and pack 100 will be apparent to a person of ordinary skill in the art. For example, the components of FIG. 11, such as the regulating PCB 1106, PCM 1110 or MCU 1104 may be provided as individual devices, or one or more of such components may be integrated together, for example, as part of the PCBs 160, 135 and/or 154 shown in FIG. 8. Alternatively, one or more of them may be separate components. In addition, the functionality may be distributed differently between the various components. Similarly, there are numerous potential variations for the connector 703 of the pack 100 and the connector 900 of the e-cigarette 10. For example, the connectors 703, 900 may vary in position, size, shape, etc., so long as the connectors 703 and 900 are able to provide an electrical connection with each other to allow current to flow from the battery 151 of the pack 100 to the battery 210 of the e-cigarette 10.

The various safety components of the e-cigarette 10 and the pack 100, as described above, inter alia, with reference to FIGS. 10 and 11, all contribute to the overall control of the e-cigarette 10 and pack 100 during charging of both the e-cigarette 10 and the pack 100, as well as during normal operation of the e-cigarette by the user. This results in a rechargeable e-cigarette 10 and pack 100 that have enhanced reliability and safety. It will be appreciated that other implementations may incorporate only some (rather than all) of the above-mentioned safety components of the e-cigarette 10 and/or pack 100, and/or may potentially incorporate additional safety components.

Furthermore, the approach described herein can be extended to a range of electronic vapor provision systems, such as heat-not-burn devices (which may include some plant matter or extract, for example, tobacco leaf, which is then heated or provided with steam to produce the desired vapor). One example of such an alternative form of electronic vapor provision system is described in US 2011/0226236, which discloses an inhaler containing an evaporator based on a composite planar structure that incorporates both a heating mechanism and wicking mechanism.

In conclusion, this disclosure shows by way of illustration various embodiments in which the claimed invention(s) may be practiced. The advantages and features of the disclosure are of a representative sample of embodiments only, and are not exhaustive and/or exclusive. They are presented only to assist in understanding and to teach the claimed invention(s). It is to be understood that advantages, embodiments, examples, functions, features, structures, and/or other aspects of the disclosure are not to be considered limitations on the disclosure as defined by the claims or limitations on equivalents to the claims, and that other embodiments may be utilized and modifications may be made without departing from the scope of the claims. Various embodiments may suitably comprise, consist of, or consist essentially of, various combinations of the disclosed elements, components, features, parts, steps, means, etc other than those specifically described herein. The disclosure may include one or more other inventions not presently claimed, but which may be claimed in future.

The invention claimed is:

1. A rechargeable e-cigarette comprising:
   a battery which provides a voltage output that has a maximum level when the battery is fully charged;
   a connector located on an exterior of the e-cigarette to allow the e-cigarette to be electrically connected to an external power supply for re-charging without disassembly of the e-cigarette; and
   a recharging mechanism for re-charging the battery using power from the external power supply when the connector is electrically connected to the external power supply;
   wherein the re-charging mechanism is configured to determine the voltage output of the battery, and to prevent re-charging of the battery if the voltage output of the battery is above a first predefined threshold level, wherein the first predefined threshold level is below the maximum level of the voltage output of the battery, wherein the first predefined threshold level (P) represents an offset (O) relative to the maximum voltage output level (M) of the battery, and wherein $O=M-P$, and O is in a range of 0.075V to 0.3V.

2. The e-cigarette of claim 1, wherein O is in the range of 0.1V to 0.2V.

3. A combination of the e-cigarette of claim 1 and a rechargeable pack for containing and recharging the e-cigarette, the pack comprising:
a pack battery;
a first connector which is electrically connectable to an external power source;
a first recharging mechanism for re-charging the pack battery using the external power source when the first connector is electrically connected to the external power source;
a tube for receiving the e-cigarette such that the e-cigarette can be contained within the recharging pack, wherein the e-cigarette includes an e-cigarette battery;
a second connector which is electrically connectable to the e-cigarette when the e-cigarette is received within the tube without disassembly of the e-cigarette; and
a second recharging mechanism for re-charging the e-cigarette battery using the pack battery when the e-cigarette is electrically connected to the second connector.

4. The combination of claim 3, wherein the second recharging mechanism is configured to determine the voltage output of the e-cigarette battery, and to prevent re-charging of the e-cigarette battery if the voltage output of the e-cigarette battery is above a predefined threshold level, wherein the predefined threshold level is below a maximum voltage output level of the e-cigarette battery, and wherein the predefined threshold level (P) represents an offset (O) relative to a maximum voltage output level (M) of the battery, wherein O=M−P, and O is in a range of 0.075V to 0.3V.

5. The rechargeable e-cigarette of claim 1, further having a second predefined threshold lower than the first predefined threshold, wherein current from the battery is cut off if the voltage output of the battery falls below the second predefined threshold.

6. A method of operating a rechargeable e-cigarette comprising a battery which provides a voltage output that has a maximum level when the battery is fully charged; a connector located on an exterior of the e-cigarette to allow the e-cigarette to be electrically connected to an external power supply for re-charging without disassembly of the e-cigarette; and a recharging mechanism for re-charging the battery using power from the external power supply when the connector is electrically connected to the external power supply, the method comprising:
determining the voltage output of the battery; and
preventing re-charging of the battery if the voltage output of the battery is above a predefined threshold level, wherein the predefined threshold level is below the maximum level of the voltage output of the battery, wherein the predefined threshold level (P) represents an offset (O) relative to a maximum voltage output level (M) of the battery, wherein O=M−P, and O is in a range of 0.075V to 0.3V.

7. A rechargeable pack for containing and recharging an e-cigarette, the pack comprising:
a pack battery;
a first connector which is electrically connectable to an external power source;
a first recharging mechanism for re-charging the pack battery using the external power source when the first connector is electrically connected to the external power source;
a tube for receiving an e-cigarette such that the e-cigarette can be contained within the recharging pack, wherein the e-cigarette includes an e-cigarette battery;
a second connector which is electrically connectable to the e-cigarette when the e-cigarette is received within the tube without disassembly of the e-cigarette; and
a second recharging mechanism for re-charging the e-cigarette battery using the pack battery when the e-cigarette is electrically connected to the second connector;
wherein the second recharging mechanism is configured to determine the voltage output of the e-cigarette battery, and to prevent re-charging of the e-cigarette battery if the voltage output of the e-cigarette battery is above a predefined threshold level, wherein the predefined threshold level is below a maximum voltage output level of the e-cigarette battery, and wherein the predefined threshold level (P) represents an offset (O) relative to a maximum voltage output level (M) of the battery, wherein O=M−P, and O is in a range of 0.075V to 0.3V.

8. The pack of claim 7, wherein for normal use of the pack, the tube has a substantially vertical orientation, and an e-cigarette received into the tube engages the second connector under the force of gravity.

9. A method of operating a rechargeable pack for containing and recharging an electronic vapor provision system, the pack comprising a pack battery; a first connector which is electrically connectable to an external power source for re-charging the pack battery using the external power source when the first connector is electrically connected to the external power source; a tube for receiving an electronic vapor provision system such that the electronic vapor provision system can be contained within the recharging pack; a second connector which is electrically connectable to the electronic vapor provision system when the electronic vapor provision system is received within the tube for re-charging the electronic vapor provision system using the pack battery when the electronic vapor provision system is electrically connected to the second connector; the method comprising:
detecting when a foreign object may be located in the tube by attempting and failing to find a signal associated with the presence of an electronic vapor provision system in the tube; and
responsive to the detecting, not initiating or discontinuing recharging of the electronic vapor provision system by preventing the pack battery providing current through the second connector.

10. The method of claim 9, wherein the detecting further comprises monitoring the current provided through the second connector.

11. The method of claim 10, wherein the detecting comprises determining if the current provided through the second connector exceeds a predetermined threshold.

12. The method of claim 9, wherein the signal is an optical signal.

13. The method of claim 9, wherein the signal is an electrical signal.

14. The method of claim 9, wherein for normal use of the pack, the tube has a substantially vertical orientation, and an electronic vapor provision system received into the tube engages the second connector under the force of gravity.

15. The method of claim 9, wherein the pack comprises a lid and a switch for detecting opening and closing of the lid, the method further comprising:

opening the lid to reset the pack such that current may be provided across the second connector when the lid is next closed; and removing the foreign object.

16. A rechargeable pack for containing and recharging an electronic vapor provision system, the pack comprising:
- a pack battery;
- a first connector which is electrically connectable to an external power source for recharging the pack battery using the external power source when the first connector is electrically connected to the external power source;
- a tube for receiving an electronic vapor provision system such that the electronic vapor provision system can be contained within the recharging pack;
- a second connector which is electrically connectable to the electronic vapor provision system when the electronic vapor provision system is received within the tube for re-charging the electronic vapor provision system using the pack battery when the electronic vapor provision system is electrically connected to the second connector; and
- a control system configured to:
  - detect when a foreign object may be located in the tube by attempting and failing to find a signal associated with the presence of an electronic vapor provision system in the tube; and
  - responsive to the detecting, not initiate or discontinue re-charging of the electronic vapor provision system by preventing the pack battery providing current through the second connector.

* * * * *